United States Patent
Teubner

(10) Patent No.: US 6,981,257 B2
(45) Date of Patent: Dec. 27, 2005

(54) SYSTEM, METHOD AND APPARATUS TO ALLOW COMMUNICATION BETWEEN CICS AND NON-CICS SOFTWARE APPLICATIONS

(76) Inventor: Russell W. Teubner, 5717 Woodlake Dr., Stillwater, OK (US) 74074

( * ) Notice: Subject to any disclaimer, the term of this patent is extended or adjusted under 35 U.S.C. 154(b) by 748 days.

(21) Appl. No.: 10/051,247

(22) Filed: Jan. 18, 2002

(65) Prior Publication Data

US 2002/0178299 A1 Nov. 28, 2002

Related U.S. Application Data

(60) Provisional application No. 60/262,903, filed on Jan. 19, 2001.

(51) Int. Cl.[7] ................................................. G06F 9/46
(52) U.S. Cl. ...................... 718/101; 715/513; 719/320; 709/203; 717/136
(58) Field of Search .......................... 718/101; 719/310, 719/320; 717/136; 709/200–203, 217–219; 705/1

(56) References Cited

U.S. PATENT DOCUMENTS

| | | | |
|---|---|---|---|
| 5,854,750 A | 12/1998 | Phillips et al. | 364/478.04 |
| 5,928,323 A | 7/1999 | Gosling et al. | 709/203 |
| 6,012,098 A | 1/2000 | Bayeh et al. | 709/246 |
| 6,038,587 A | 3/2000 | Philllips et al. | 709/101 |
| 6,209,124 B1 | 3/2001 | Vermeire et al. | 717/1 |
| 2002/0038336 A1 * | 3/2002 | Abileah et al. | 709/203 |
| 2002/0042849 A1 * | 4/2002 | Ho et al. | 709/329 |
| 2002/0091553 A1 * | 7/2002 | Ims et al. | 705/1 |

FOREIGN PATENT DOCUMENTS

| | | |
|---|---|---|
| JP | 411306205 A | 11/1999 |
| JP | 02000222275 A | 8/2000 |

OTHER PUBLICATIONS

Agarwal, et al.; Reengineering Legacy System Using Web; 2000 IEEE; 0–7695–0792–1/00.

Estes, Don; Second Generation Legacy to Web Strategies Via, XML, Part 1—Business Stretegic Issues; Forecross Corporation; 2000/ XP–002247124.

* cited by examiner

Primary Examiner—St. John Courtenay, III
(74) Attorney, Agent, or Firm—Winstead Sechrest & Minick

(57) ABSTRACT

A system, method and apparatus to facilitate the invocation of existing CICS BMS transactions and deliver the executed transaction output to a requesting application as a standardized XML document. Building upon a facility which intercepts the flow of control between a user transaction and BMS, the instant invention replaces the use of terminal-oriented data streams with XML documents. In doing so, the instant invention eliminates the use of prior art techniques, such as "screen scraping".

20 Claims, 27 Drawing Sheets

Terminal Input 1 -- Specify Transaction Name

Terminal Output 1 -- Company Selection Screen

FIG. 14

```
    Share Trading Demonstration      TRADER.T002
 Share Trading Manager: Company Selection 1. Casey_Import_Export
              2. Glass_and_Luget_Plc
              3. Headworth_Electrical
              4. IBM Please select a company (1,2,3 or 4) :   1

------------------------------------------------
PF3=Exit                                PF12=Exit
```

Terminal Input 2 -- Select Company

FIG. 15

```
    Share Trading Demonstration      TRADER.T003

Share Trading Manager: Options

1. New Real-Time Quote

2. Buy Shares

3. Sell Shares

Please select a company (1,2 or 3):

------------------------------------------------
PF3=Return                              PF12=Exit
```

Terminal Output 2 -- Option Selection Screen

FIG. 16

```
  Share Trading Demonstration    TRADER.T003

Share Trading Manager: Options

1. New Real-Time Quote

2. Buy Shares

3. Sell Shares

Please select a company (1,2 or 3):   1

_____
 PF3=Return                             PF12=Exit
```

Terminal Input 3 -- Select Company

FIG. 17

```
       Share Trading Demonstration    TRADER.T004
         Share Trading Manager: Real-Time Quote
  User Name:       RUSS
  Company Name:  Casey_Import_Export Share Values:              Commission Cost:
   NOW:           00079.00      for Selling:    007
   1 week ago:    00059.00      for Buying:     010
   6 days ago:    00063.00
   5 days ago:    00065.00
   4 days ago:    00070.00
   3 days ago:    00072.00
   2 days ago:    00078.00  Number of Shares Held: 5693
   1 day ago:     00077.00  Value of Shares Held: 000449747.00

Request Completed OK
 _____
 PF3=Return                             PF12=Exit
```

Terminal Output 3 – Stock Quote Screen

FIG. 18

```
Trader: Session Over
```

Terminal Output 4 -- Session Termination Screen

FIG. 19A  XML Response 1 – Company Selection Document

```
<?xml version="1.0" encoding="ISO-8859-1" standalone="yes"?>
<request>
    <token>ca445fb5</token>
    <timestamp>20020113025852</timestamp>
    <status>
        <response>0</response>
        <desc>ok</desc>
    </status>
    <transaction tranid="TRAD" facility="}AAB" next_tranid="TRAD"
    next_tranid_src="normal">
        <status>
            <cics_resp>0</cics_resp>
            <cics_resp2>0</cics_resp2>
            <cics_desc>NORMAL</cics_desc>
            <task_end>endtask</task_end>
            <abend_code>;  </abend_code>
        </status>
        <parameters>
            <tranid>TRAD</tranid>
            <entry>TRAD</entry>
            <userid>DSI1   </userid>
        </parameters>
        <command src="TRADERPL">
            <send_map erase="y" erase_unp="n" unlock_kb="y" alarm="n" reset_mdt="n" >
                <mapset>TRADBMS </mapset>
                <map>T002    </map>
                <data_indicator>map_and_data</data_indicator>
                <fields count="6">
                    <field name="COMP1" index="0">
                        <name_len="5">COMP1</name>
```

FIG. 19B  XML Response 1 – Company Selection Document

```
    <value maxlen="20" len="19">Casey Import Export</value>
    <attr byte="60" justify="1" disp="y" prot="y" num="n" int="n"
    mdt="n"/>
</field>
<field name="COMP2" index="0">
    <name len="5">COMP2</name>
    <value maxlen="20" len="19">Glass and Luget Plc</value>
    <attr byte="60" justify="1" disp="y" prot="y" num="n" int="n"
    mdt="n"/>
</field>
<field name="COMP3" index="0">
    <name len="5">COMP3</name>
    <value maxlen="20" len="20">Headworth_Electrical</value>
    <attr byte="60" justify="1" disp="y" prot="y" num="n" int="n"
    mdt="n"/>
</field>
<field name="COMP4" index="0">
    <name len="5">COMP4</name>
    <value maxlen="20" len="3">IBM</value>
    <attr byte="60" justify="1" disp="y" prot="y" num="n" int="n"
    mdt="n"/>
</field>
<field name="OPTION" index="0">
    <name len="6">OPTION</name>
    <value maxlen="1" len="0"></value>
    <attr byte="50" justify="1" disp="y" prot="n" num="y" int="n"
    mdt="n"/>
</field>
<field name="MESS2" index="0">
    <name len="5">MESS2</name>
```

FIG. 19C  XML Response 1 -- Company Selection Document

```
        <value maxlen="79" len="0"></value>
        <attr byte="60" justify="l" disp="y" prot="y" num="n" int="n" mdt="n"/>
      </field>
    </fields>
    <cursor type="none"/>
   </send_map>
  </command>
 </transaction>
</request>
```

FIG. 20A  XML Response 2 -- Option Selection Document

```
<?xml version="1.0" encoding="ISO-8859-1" standalone="yes"?>
<request>
    <token>ca445fb5</token>
    <timestamp>20020113025955</timestamp>
    <status>
        <response>0</response>
        <desc>ok</desc>
    </status>
    <transaction tranid="TRAD" facility="}AAB" next_tranid="TRAD"
    next_tranid_src="normal">
        <status>
            <cics_resp>0</cics_resp>
            <cics_resp2>0</cics_resp2>
            <cics_desc>NORMAL</cics_desc>
            <task_end>endtask</task_end>
            <abend_code>    </abend_code>
        </status>
        <parameters>
            <tranid>TRAD</tranid>
            <entry>TRAD</entry>
            <userid>DSI1    </userid>
        </parameters>
        <command src="TRADERPL">
            <send_map erase="y" erase_unp="n" unlock_kb="y" alarm="n" reset_mdt="n" >
                <mapset>TRADBMS </mapset>
                <map>T003    </map>
```

FIG. 20B    XML Response 2 -- Option Selection Document

```
        <data_indicator>map_and_data</data_indicator>
        <fields count="2">
          <field name="OPT2" index="0">
            <name len="4">OPT2</name>
            <value maxlen="1" len="0"></value>
            <attr byte="50" justify="l" disp="y" prot="n" num="y" int="n"
mdt="n"/>
          </field>
          <field name="MESS3" index="0">
            <name len="5">MESS3</name>
            <value maxlen="79" len="0"></value>
            <attr byte="60" justify="l" disp="y" prot="y" num="n" int="n"
mdt="n"/>
          </field>
        </fields>
        <cursor type="none"/>
      </send_map>
    </command>
  </transaction>
</request>
```

FIG. 21A    XML Response 3 -- Stock Quote Document

```
<?xml version="1.0" encoding="ISO-8859-1" standalone="yes"?>
<request>
    <token>ca445fb5</token>
    <timestamp>20020113030019</timestamp>
    <status>
        <response>0</response>
        <desc>ok</desc>
    </status>
<transaction tranid="TRAD" facility="}AAB" next_tranid="TRAD"
next_tranid_src="normal">
    <status>
        <cics_resp>0</cics_resp>
        <cics_resp2>0</cics_resp2>
        <cics_desc>NORMAL</cics_desc>
        <task_end>endtask</task_end>
        <abend_code>     </abend_code>
    </status>
    <parameters>
        <tranid>TRAD</tranid>
        <entry>TRAD</entry>
        <userid>DSI1    </userid>
    </parameters>
<command src="TRADERPL">
<send_map erase="y" erase_unp="n" unlock_kb="y" alarm="n" reset_mdt="n" >
    <mapset>TRADBMS </mapset>
    <map>T004    </map>
```

FIG. 21B   XML Response 3 -- Stock Quote Document

```xml
<data_indicator>map_and_data</data_indicator>
<fields count="15">
    <field name="USER41" index="0">
        <name len="6">USER41</name>
        <value maxlen="20" len="4">RUSS</value>
        <attr byte="60" justify="1" disp="y" prot="y" num="n" int="n"
mdt="n"/>
    </field>
    <field name="COMP41" index="0">
        <name len="6">COMP41</name>
        <value maxlen="20" len="19">Casey_Import_Export</value>
        <attr byte="60" justify="1" disp="y" prot="y" num="n" int="n"
mdt="n"/>
    </field>
    <field name="SHRNOW" index="0">
        <name len="6">SHRNOW</name>
        <value maxlen="8" len="8">00079.00</value>
        <attr byte="60" justify="1" disp="y" prot="y" num="n" int="n"
mdt="n"/>
    </field>
    <field name="SELL" index="0">
        <name len="4">SELL</name>
        <value maxlen="12" len="3">007</value>
        <attr byte="f0" justify="1" disp="y" prot="y" num="y" int="n"
mdt="n"/>
    </field>
```

FIG. 21C  XML Response 3 -- Stock Quote Document

```
<field name="SHARE7" index="0">
<name len="6">SHARE7</name>
<value maxlen="8" len="8">00059.00</value>
<attr byte="60" justify="l" disp="y" prot="y" num="n" int="n"
mdt="n"/>
</field>
<field name="SHARE6" index="0">
<name len="6">SHARE6</name>
<value maxlen="8" len="8">00063.00</value>
<attr byte="60" justify="l" disp="y" prot="y" num="n" int="n"
mdt="n"/>
</field>
<field name="BUY" index="0">
<name len="3">BUY</name>
<value maxlen="12" len="3">010</value>
<attr byte="f0" justify="l" disp="y" prot="y" num="y" int="n"
mdt="n"/>
</field><field name="SHARE5" index="0">
<name len="6">SHARE5</name>
<value maxlen="8" len="8">00065.00</value>
<attr byte="f0" justify="l" disp="y" prot="y" num="y" int="n"
mdt="n"/>
</field>
<field name="SHARE4" index="0">
<name len="6">SHARE4</name>
<value maxlen="8" len="8">00070.00</value>
```

FIG. 21D  XML Response 3 -- Stock Quote Document

```
    <attr byte="f0" justify="1" disp="y" prot="y" num="y" int="n"
mdt="n"/>
</field>
<field name="SHARE3" index="0">
    <name len="6">SHARE3</name>
    <value maxlen="8" len="8">00072.00</value>
    <attr byte="f0" justify="1" disp="y" prot="y" num="y" int="n"
mdt="n"/>
</field>
<field name="SHARE2" index="0">
    <name len="6">SHARE2</name>
    <value maxlen="8" len="8">00078.00</value>
    <attr byte="f0" justify="1" disp="y" prot="y" num="y" int="n"
mdt="n"/>
</field>
<field name="HELD" index="0">
    <name len="4">HELD</name>
    <value maxlen="12" len="4">5693</value>
    <attr byte="f0" justify="1" disp="y" prot="y" num="y" int="n"
mdt="n"/>
</field>
<field name="SHARE1" index="0">
    <name len="6">SHARE1</name>
    <value maxlen="8" len="8">00077.00</value>
    <attr byte="f0" justify="1" disp="y" prot="y" num="y" int="n"
mdt="n"/>
```

FIG. 21E  XML Response 3 -- Stock Quote Document

```
      </field>
      <field name="VALUE" index="0">
        <name len="5">VALUE</name>
        <value maxlen="12" len="12">000449747.00</value>
        <attr byte="f0" justify="r" disp="y" prot="y" num="y" int="n"
        mdt="n"/>
      </field>
      <field name="MESS4" index="0">
        <name len="5">MESS4</name>
        <value;maxlen="79" len="20">Request Completed OK</value>
        <attr byte="60" justify="l" disp="y" prot="y" num="n" int="n"
        mdt="n"/>
      </field>
    </fields>
    <cursor type="none"/>
   </send_map>
  </command>
 </transaction>
</request>
```

FIG. 22  XML Output 4 -- Transaction Termination Document

```
<?xml version="1.0" encoding="ISO-8859-1" standalone="yes"?>
<request>
    <token></token>
    <timestamp>20020113030037</timestamp>
    <status>
        <response>0</response>
        <desc>ok</desc>
    </status>
    <transaction tranid="TRAD" facility="}AAB" next_tranid="" next_tranid_src="" ">
        <status>
            <cics_resp>0</cics_resp>
            <cics_resp2>0</cics_resp2>
            <cics_desc>NORMAL</cics_desc>
            <task_end>endtask</task_end>
            <abend_code> </abend_code>
        </status>
        <parameters>
            <tranid>TRAD</tranid>
            <entry>TRAD</entry>
            <userid>DSI1    </userid>
            <aid>PF12</aid>
        </parameters>
        <command src="TRADERPL">
            <send erase="n">
                <data len="20">Trader: Session Over</data>
            </send>
        </command>
    </transaction>
</request>
```

US 6,981,257 B2

SYSTEM, METHOD AND APPARATUS TO ALLOW COMMUNICATION BETWEEN CICS AND NON-CICS SOFTWARE APPLICATIONS

REFERENCE TO PENDING APPLICATIONS

This application claims the benefit of U.S. Provisional Application No. 60/262,903, filed Jan. 19, 2001, and incorporated by reference herein in its entirety.

REFERENCE TO MICROFICHE APPENDIX

This application is not referenced in any microfiche appendix.

TECHNICAL FIELD OF THE INVENTION

In general, the present invention is directed to a middleware tool to allow communication between two or more disparate and distinct computer operating platforms and applications. In particular, the present invention is directed to a middleware tool to facilitate access to, and execution of, existing CICS transactions from a disparate platform requesting application with output from the executed transaction communicated to said requesting application as an XML document.

BACKGROUND OF THE INVENTION

The instant invention is a comprehensive software driven solution which provides business enterprises with a quantum leap forward when integrating their existing CICS transactions into scalable e-Business applications. As such the instant invention is believed to be the first solution for invoking existing CICS BMS transactions and delivering their output as an XML document—not a highly restrictive 3270 screen as provided for in today's prior art systems. "XML" refers to Extensible Markup Language and allows designers to create their own customized tags, enabling the definition, transmission, validation, and interpretation of data between applications and between organizations.

The term "tag" refers to a command inserted in a document that specifies how the document, or a portion of the document, should be formatted. Tags are used by all format specifications that store documents as text files. This includes SGML and HTML.

CICS transactions, running on IBM enterprise servers, are the most common category of host-based e-Business transactions. Enterprises have typically extended these transactions to the web using "web-to-host" products that rely on terminal emulation, screen scraping, proprietary development tools and scripting languages. As corporations continue making the transition from 'bricks-and-mortar' enterprises to 'clicks-and-mortar', they must provide employees, partners, and customers with better access to enterprise data via intranets, extranets and the Internet. This requires a more robust, scalable and cost-effective approach to legacy application and data integration than is afforded by existing art systems. Succinctly stated, industry standards like XML are key to e-Business enablement, but are of no benefit to industry if one of the most common categories of e-Business transactions can not take advantage of its benefit. By replacing terminal-oriented data streams with an XML document containing simple name/value pairs, the instant invention advances the art and drastically reduces the complexity of integrating CICS data with e-Business applications.

"Today, IBM customers use CICS to process over 30 billion transactions per day with a commercial value of several trillion dollars per week," says Dr. Geoff Sharman, senior consultant with IBM Transaction Systems. "By allowing these customers to XML-enable existing transactions without code changes, the instant invention demonstrates how easily CICS transactions can be integrated into rapidly deployed and highly scalable e-business applications." The instant invention facilitates this integration by providing a platform-neutral, XML pathway from CICS transactions to client application irrespective of the computing platform on which they execute. In doing so, the instant invention completely circumvents the use of 3270 data streams and the many, layered components associated with the screen scraping-based solutions of the present art.

"Many enterprises that are using web-to-host solutions which rely on screen scraping techniques are finding they have difficulty scaling," says Darcy Fowkes, research director of Internet services for the Aberdeen Group. "This is unacceptable to organizations that have a large investment in CICS/BMS applications that are running in high volume, production environments." These organizations need an alternative to terminal emulation and screen scraping-based technologies to "e-enable" these production environments. The instant invention provides a more direct, XML pathway to middle-tier application servers and the present invention allows the web-enabling of legacy CICS transactions, replacing web-to-host solutions that rely on screen scraping.

The instant invention expresses output from an existing CICS/BMS transaction as an XML document containing order independent, name-value pairs rather than a fixed format, 3270 screen buffer. This eliminates the client application's dependence on screen formats as well as the need to synchronize changes to the host and client applications. The instant invention is insensitive to changes in the location of fields on a 3270 screen that would cause screen scraping solutions to fail because it intercepts data into, and out of, a CICS transaction before a 3270 data stream is generated as output or expected as input. In fact, using the instant invention, a 3270 data stream is never created. This is possible because the instant invention interacts with CICS applications through the 3270 Bridge interface, a standard feature of CICS Transaction Server version 1.3 (or later). Consequently, no modifications to CICS applications are required; no per-transaction setup is required either.

The instant invention is compatible with any client application or middle-tier application server that can send a request to an IBM mainframe and receive an XML document. This includes, without limitations, IBM WebSphere™, BEA WebLogic® and SilverStream Application Server. The instant invention also compliments, without limitation, the broad range of evolving middleware technologies based upon XML, including Microsoft BizTalk and SilverStream eXtend™. To paraphrase Fred Holahan, VP & General Manager "Although major application software vendors are embracing XML as their eBusiness interoperability standard, the application portfolios of many enterprises include host-based legacy systems. To succeed in eBusiness integration, enterprises need a range of choices for XML-enabling their host-based applications. The instant invention's technology provides a unique approach for XML-enabling CICS terminal-oriented applications, one that complements SilverStream's legacy integration strategy. Once CICS transactions have been XML-enabled using the instant invention, they can be accessed by eXtend to support real-time integrations with Web portals, trading exchanges, vendor packages and non-CICS legacy applications."

BRIEF SUMMARY OF THE INVENTION

The present invention is directed to a middleware tool that allows access to, and execution of, existing CICS transactions from a desperate and distinct operating system and application. The present invention embodies a system, method and apparatus to facilitate the invocation of existing CICS transactions and deliver said transactions' output to a requesting application as a standardized XML document via interception of the flow of data into and out of a CICS transaction before a 3270 data stream is generated as output or expected as input. This approach preserves the business logic of the CICS applications and provides an industry-standard means of exchanging data between CICS and any other XML-enabled applications.

XML is a data format for structured document exchange between applications. Like HTML, it is a markup language derived from SGML. However, unlike HTML, which the Internet community created to format information and display it across multiple platforms, XML is best suited to organize data for structured document exchange between applications. While HTML specifies how a document should appear, it does not describe what kind of information the document contains or how it is organized. XML allows you to organize information in a standard way that can enable disparate systems to conduct business transactions in a known format. For example, business partners can standardize on specific XML syntax to describe purchase orders and can then automate the transfer of that information across otherwise incompatible systems. The key benefit of retrieving host data in XML is that the information is completely independent of how you wish to display it. Because XML is an industry-standard markup language, it can be used for multiple purposes. For example, an eXtensible Style Language Transformation (XSLT) allows you to map XML tags and transform them to any other format.

The present invention runs on the mainframe under OS/390. It is built on the foundation of a feature that IBM has recently added to CICS Transaction Server. The 3270 Bridge makes it possible to intercept the flow of data into, and out of, a CICS transaction before a 3270 data stream is generated as output or expected as input. 3270 Bridge works by intercepting the flow of control between the user transaction and BMS, thereby allowing another software component, such as the present invention, to handle input/output operations for the transaction.

The present invention provides a flexible, scalable, and easy-to-use solution that makes CICS applications usable in e-Business by converting application data to XML. Unlike current art solutions that rely on "screen scraping", there is no need to identify field locations on a screen. As a result, if CICS developers make changes to their applications by adding or removing fields on a screen, web applications that use the present invention to access the CICS applications will not be affected. This saves time and money for development staff and reduces the chances that users will receive errors when they access your web applications.

Many current host application access solutions run on intermediate UNIX or NT web servers. Running alongside an SNA stack and a web server, these products receive a 3270 datastream, parse it, and then convert the datastream to HTML for presentation in web browsers. Because so much work is done on the single UNIX or NT machine, these products are unable to scale. They are sufficient for simple business-to-consumer (B2C) applications where occasional users logon to check account status or to see if a library book is on the shelves, but when it comes to the needs of B2B applications that produce thousands of transactions each day, traditional web-to-host technology simply cannot keep up.

The present invention is a solution that allows other applications to access legacy data and use it in innovative ways to reduce training costs, improve business efficiency, and unlock the valuable data companies spend years accumulating in their mainframes.

Consequently, it is an object of the instant invention to accept a request from a client program which specifies the name of a CICS transaction and any required input data; cause said transaction to be executed; intercept the input and output commands; and format said output as an XML document to be returned to the client.

A further object of the instant invention is to allow enterprises to integrate existing CICS transactions into scalable e-business applications.

An additional object of the instant invention is to facilitate communication between CICS and non-CICS platforms and applications absent screen scrapping requirements attendant to prior art systems.

A further object of the instant invention is to provide for XML based communication between CICS transactions and client applications absent need for CICS application transaction or system modification.

Other objects and further scope of the applicability of the present invention will become apparent from the detailed description to follow, taken in conjunction with the accompanying drawings wherein like parts are designated by like reference numerals.

DESCRIPTION OF THE DRAWINGS

FIGS. 12 through 18 illustrate the use of a sample CICS BMS transaction from a terminal device.

FIGS. 19A through 19C, 20A and 20B and 21A through 21E illustrate the XML output generated by the instant invention during it's use with a sample CICS BMS transaction.

FIG. 22 illustrates the termination of the transaction.

DETAILED DESCRIPTION OF THE PREFERRED EMBODIMENT

Figure 1:
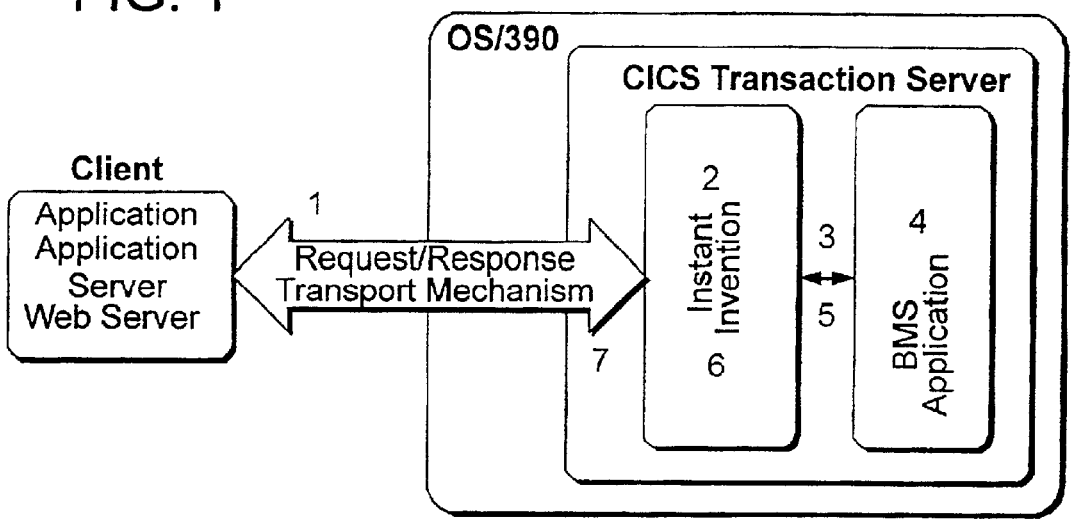
FIG. 1 illustrates the basic system architecture as well as the present invention's independence from the particular transport mechanism used to exchange requests and response with the client.

While the making and using of various embodiments of the present invention are discussed in detail below, it should be appreciated that the present invention provides for inventive concepts capable of being embodied in a variety of specific contexts. The specific embodiments discussed herein are merely illustrative of specific manners in which to make and use the invention and are not to be interpreted as limiting the scope of the present invention.

The specification describe the invention presented and the terms that are employed draw their meaning from the use of such terms in the specification. The same terms employed in the prior art may be broader in meaning than specifically employed herein. Whenever there is a question between the broader definition of such terms used in the prior art and the more specific use of the terms herein, the more specific meaning is meant.

For purposes of full and enabling disclosure, the following code specifications are herein provided to disclose in a comprehensive manner, the teachings and processes wherein the instant invention accepts a client request, invokes the CICS transaction and generates an extensible mark-up language (XML) document based upon information received from a CICS system via a 3270 Bridge interface.

It is clear, given benefit of the instant invention detail disclosure, that one reasonably skilled in the art could develop similarly intended coding specifications which would replicate the functionality of the processes provided herein. Consequently, it is intended the instant invention encompasses any such functionally equivalent processes and does not limit itself to this specific coding specifications submitted hereunder.

As used herein, the following provides a glossary of terms referred to in this disclosure and the non-limiting, though generally accepted meanings thereof.

| Term | Descriptive Intent |
|---|---|
| 3270 Bridge | See Terminal I/O Intercept Facility |
| 3270 Terminal | A terminal in the IBM 3270 series of terminals (e.g., 3277, 3278, 3279). These terminals communicate with an intermediate terminal controller and understand the 3270 datastream as the means for updating the screen and sending input data back to the controller. |
| 3270 Transaction (or non-BMS Transaction) | A CICS terminal-oriented transaction that does not rely upon BMS to interact with a terminal device. Instead, a 3270 transaction includes programming steps to encode and decode the required 3270 terminal data streams. |
| ADSD (Application Data Structure Descriptor) | A machine readable collection of information describing the contents of a particular ADS. The ADSD allows a program to correctly interpret the field information within the ADS. |
| Application Data Structure (ADS) | The machine readable collection of fields associated with a particular map. For each field, the data consists of field value/contents and attributes describing the field. |
| Basic Mapping Support (BMS) | Basic mapping support (BMS) is an application programming interface between CICS programs and terminal devices. Use of BMS has several advantages. First, BMS removes device dependencies from the application program. It interprets device-independent output commands and generates device-dependent data streams for specific terminals. It also transforms incoming device-dependent data into device-independent format. These features eliminate the need for programmers to learn complex device data streams. They also allow the programmer to use the same program for a variety of devices, because BMS determines the device information from the terminal definition, not from the application program. Second, BMS separates the design and preparation of screen formats from application logic, reducing the impact of one on the other. Both of these features make it easier to write new programs and to maintain existing code. (IBM CICS TS 1.3 Application Guide) |
| BMS Command | BMS transactions invoke the services of BMS by issuing a BMS Commands. The two most common BMS Commands are SEND MAP and RECEIVE MAP. |
| BMS Transaction | A CICS terminal-oriented transaction that relies upon BMS to interact with a terminal device. |
| CICS (Customer Information Control System) | IBM's general-purpose online transaction processing (OLTP) software is an e-business, industrial-strength, server for mission-critical applications. CICS is an application server that runs on S/390 servers and a range of other operating systems, IBM and non-IBM, from the smallest desktop to the largest mainframe. It is used in Client/Server environments and in networks ranging in size from a few terminals to many thousands of terminals. It is a layer of middleware that seamlessly integrates all the basic software services required by OLTP applications together with a rich set of resources and management services in a |

-continued

| Term | Descriptive Intent |
|---|---|
| | highly available, reliable, and scaleable manner, enabling its customers to concentrate on the tasks relevant to their particular business. Its application programming interface (API) enables programmers to port applications to and from a wide variety of hardware and software platforms where CICS is available, and because each product in the CICS family can interface with other members of the CICS family, this enables inter-product communication. Customers may write their own applications or choose from many existing vendor-written products. CICS is an IBM licensed program.<br>(IBM CICS TS 1.3 Glossary) |
| Client | The source of a request sent to the instant invention. |
| Commarea Transaction (or Non-Visual Transaction) | See Non-Visual Transaction. |
| Context Manager | A repository for storing information to allow the instant invention to serve clients which are stateless and not connected for the same lifetime as the backend resources. Using the context manager, information can be saved between requests from a particular client. |
| Data Indicator Flag | A flag indicating whether the CICS SEND MAP command specified the MAPONLY option, the DATAONLY option, or neither. |
| DATAONLY | An option of the CICS SEND MAP command. When present, this option indicates that only the application program data from the ADS is to be displayed on the screen. The contents of the physical map will not be displayed or updated. |
| Element (XML Element) | See XML. |
| ERASE | An option of the CICS SEND MAP command. When present, this option causes the terminal screen to be erased before the map and/or data are displayed. |
| Extended Attribute | Each field within a map may be assigned various extended attributes. These attributes govern such things as color, underlining and highlighting. |
| Field Attribute | Each field within a map may be assigned various attributes. These attributes govern such things as whether and what the operator can key into the field, whether the cursor stops there, the intensity of the characters, and the initial state of the modified data tag. |
| HTTP (Hypertext Transfer Protocol) | An application-level protocol for distributed, collaborative, hypermedia information systems. It is a generic, stateless, protocol which can be used for many tasks beyond its use for hypertext, such as name servers and distributed object management systems, through extension of its request methods, error codes and headers. A feature of HTTP is the typing and negotiation of data representation, allowing systems to be built independently of the data being transferred. |
| INITIAL | The definition of a field in a BMS map can include the specification of an initial, or default, value. The parameter used to set this value is the INITIAL parameter. |
| LOAD | A CICS application programming interface command which causes the specified program or mapset to be retrieved from external storage. If successful, the program or mapset requested is then accessible from the program. |
| Map | In BMS, a format established for a page or a portion of a page, or a set of screen format descriptions. A map relates program variables to the positions in which their values appear on a display device. A map contains other formatting information such as field attributes. A map describes constant fields and their position on the display, the format of input and output fields, the attributes of constant and variable fields, and the symbolic names of variable fields.<br>(IBM CICS TS 1.3 Glossary)<br>The name of a Map must be unique within its Map Set (see below). |
| Map Definition | Definition of the size, shape, position, potential content, and properties of BMS mapsets, maps, and fields within maps, by means of macros.<br>(IBM CICS TS 1.3 Glossary) |
| Map Generation | The process whereby a Map Definition is accepted as input and a Physical Map and Symbolic Map are generated as output. |
| MAPONLY | An option of the CICS SEND MAP command. When present, this option indicates that only the default data from the physical map is to be displayed on the screen. Application program data will not be displayed or updated. |
| Mapset | In BMS, one or more maps are combined into a Mapset. The effect of this combination reduces the computational overhead associated with managing multiple maps, and allows all maps needed for one application to be referenced and operated on as a unit.<br>If a map is not combined with other maps into a Mapset, then the map name and Mapset name are the same. The name of a Mapset must be unique within a single CICS system. |
| Non-BMS Transaction (or 3270 Transaction) | See 3270 Transaction. |
| Non-Visual Transaction (or Commarea Transaction) | A transaction designed to be invoked by, and interact with, another program - not a human operator at a terminal device. Such a transaction does not emit a visual interface for interaction with a human operator. Instead, the transaction receives input parameters, and returns output parameters, through a mechanism appropriate for program-to-program. By way of example, a CICS "commarea" transaction is a non-visual transaction that receives and returns its input/output data in an area of storage referred to as the "Communication Area". |
| Physical Map | A set of machine-readable instructions and data describing the contents of a map, and how BMS is to display it on the terminal screen. |

| Term | Descriptive Intent |
|---|---|
| | The Physical Map may optionally include an ADSD. The invention requires that this information exist. |
| Query String | The portion of a URL following the?. A Query String consists of name and value pairs. The name and value are separated by the '=' character. Name/value pairs are then separated by &. A Query String follows a specified format where "unsafe" characters are made "safe" by specifying them using a %xx where the xx is the hexadecimal value of the character in ASCII.<br>For example: Name1=value1&Name2=value2 |
| RECEIVE MAP | A CICS application programming interface command which causes BMS to format terminal input data and make it accessible to your application program. The parameters of the RECEIVE MAP command tell BMS:<br>Which map to use in formatting the input data stream--that is, what format is on the screen and what data structure the program expects<br>Where to find this map (which mapset it resides in)<br>Where to get the input<br>Whether to suppress translation to upper case<br>Where to put the formatted input data |
| Request | A collection of parameters and data that instructs the instant invention to execute a particular CICS transaction. The request may contain data to be provided to the transaction to satisfy its initial input requirements. |
| RETURN or RETURN IMMEDIATE | A CICS application programming interface command which causes the running transaction to return control to CICS. The IMMEDIATE option causes control to be immediately passed to the program specified by the TRANSID option. |
| Root Element | See XML. |
| Screen Scraping | "Screen scraping" is a common name/phrase referring to a technique used by programs to integrate with a terminal-oriented program. Screen scraping involves the use of row/column, or linear, coordinates within a program to create a relationship between (or "bind") data within a screen buffer and program variables. If the location of data on the screen changes (or its relative position within the terminal-oriented data stream), then the binding will be incorrect and the program that relies upon the row/column (or linear) coordinates will usually have to be changed.<br>One way to determine if screen scraping is taking place within a program process is to pose the following questions: (1) What happens if the physical location of a data value on the screen is changed?; What happens if the order of a data value within the terminal data stream is changed?; What happens if the location of a literal value on the screen is changed? If a program relies upon screen scraping techniques, various definitional changes will be required before the product will work following such changes. |
| SEND MAP | A CICS application programming interface command which instructs BMS to send mapped output data to a terminal. The parameters of the SEND MAP command tells BMS:<br>Which map to use and where to from which mapset<br>Where to find the variable data (ADS) for the map and how to merge it with the values from the map (MAPONLY and DATAONLY)<br>Which device controls to include in the data stream, and other control options<br>Where to put the cursor, if you want to override the position in the map definition |
| Simulated Terminal | A software program which mimics the interface between CICS and a terminal. A simulated terminal would use the Terminal I/O Intercept Facility to capture and respond to input and output commands issued by a transaction. |
| START | A CICS application programming interface command which causes the specified transaction or program to be started. |
| Symbolic Cursor Position | Symbolic cursor positioning is a method for denoting in which field the cursor should be placed when a map is displayed on a terminal screen. Symbolic cursor positioning ties the cursor location to a particular field. The field in which the cursor is to be located is indicated by a flag in the ADS. By tying the cursor position to a field, as opposed to a particular location on the screen, the field's screen position can be changed and the cursor will still be correctly placed. |
| Symbolic Map | A source language data structure that the assembler or compiler uses to resolve source program references to fields within an ADS.<br>(IBM CICS TS 1.3 Glossary) |
| Tag (XML Tag) | See XML. |
| Terminal | In CICS, a device, often equipped with a keyboard and some kind of display, capable of sending and receiving information over a communication channel. |
| Terminal I/O Intercept Facility | A mechanism for intercepting the input/output commands and data issued by a CICS transaction. Such a mechanism provides at least the following capabilities: (1) allows a program to request the invocation of a terminal-oriented transaction (as opposed to a human operator at a terminal), and (2) allows a program to intercept and service the terminal I/O requests issued by the transaction before the terminal-oriented data stream is generated. The instant invention presumes the existence of such a facility.<br>By way of example, recent versions of CICS include a terminal I/O intercept facility called "3270 Bridge". 3270 Bridge defines an interface whereby a terminal-oriented transaction can be invoked/operated by another program, rather than a human operator at a terminal. 3270 Bridge allow such a program |

-continued

| Term | Descriptive Intent |
|---|---|
| | to intercept BMS commands issued by the transaction before a 3270 terminal data stream is generated. The user transaction runs unchanged as if it were being driven by a real terminal. |
| Terminal Identifier | A textual identifier used to designate a specific terminal device used to interact with CICS. |
| Terminal-Oriented Transaction (or Visual Transaction) | See Visual Transaction. |
| Token | A unique value which identifies an entry in the context manager. |
| Transaction | A unit of application data processing within CICS (consisting of one or more application programs) initiated by a single request. |
| Transaction identifier (or TRANSID) | A 4 character identifier which is used to associate a transaction with an underlying program. |
| URL (Uniform Resource Locator) | A notation used to represent various entities on a network. The URL consists of constituent parts identifying the network protocol used, host name or IP address, port number and various parameters which have meaning on the machine that hosts the URL. The query string is a portion of the URL and contains instance data in a well formed format. For example: Protocol://machine:port/resource?query string |
| Visual Transaction (or Terminal-Oriented Transaction) | A transaction designed for (or that will permit) invocation by, and interaction with, a human operator at a terminal device. As such, the transaction emits a terminal-specific data stream that describes the visual interface used to interact with the human operator. The most common type of terminal that CICS transactions are designed to work with is referred to generically as a "3270" terminal. The author of a CICS terminal-oriented transaction has two primary alternatives as to how the program will support generation of the terminal-specific data stream and interaction with the terminal device. The first alternative is for the transaction to include program code that will communicate directly with the terminal device. This implies that the transaction will encode and decode the required terminal-specific data streams. The second alternative is to rely upon an external facility to handle the details associated with terminal interaction. Such an external facility creates a layer of abstraction between the transaction and the terminal device. Basic Mapping Support, a component within CICS, is an example of such a facility. |
| XML (Extensible Markup Language) | XML is a markup language for documents containing structured information and is commonly used for the exchange of data between disparate systems. Each XML document contains one or more elements, related in a hierarchical manner. The highest level element of an XML document is called the "root" element. All data must be contained by a specific element. XML is referred to as a tagging language because the boundaries of an element are either delimited by start-tags and end-tags, or, for empty elements, by an empty-element tag. A tag is begun by specifying the name of the tag surrounded by angle brackets. For example, <address>. In this case, "address" is the name of the tag. A tag is ended by including a forward slash character prior to the tag name. For example, </address>. Between the start tag and the end tag would be the value. For example, <address>100 Main Street</address>. If the address element is empty (i.e., has no value), then an empty element tag would be specified as <address/>. The full XML specification can be found at http://www.w3.org/TR/2000/REC-xml-20001006 |

FIG. 1 illustrates the basic system architecture. As shown in FIG. 1, the invention's basic components include a Client application, meaning any program or process that can send a request to the present invention, and receive and process the resulting XML document. A Client may be as simple as a web browser, or as complex as an application server, such as IBM WebSphere or BEA WebLogic. Client applications often reside on workstations or servers running the UNIX or Windows operating system.

A typical request/response exchange using the present invention consists of the following steps:

1. The client application sends a request via a transport mechanism to the present invention.

2. The present invention receives the request which indicates the CICS BMS transaction to be invoked or continued along with any input data or parameters.

3. The present invention invokes or continues the requested transaction, indicating to CICS that the present invention will handle all input and output commands issued by the transaction.

4. The CICS BMS transaction executes as though it had been executed from a terminal.

5 All input and output commands issued by the transaction are presented to the present invention for processing.

6. The present invention processes all input and output commands so as to correctly simulate the behavior of a terminal device, and generates an XML document containing the resultant data fields.

7. The present invention returns the XML document back to the client application.

As illustrated in FIG. 1, the present invention is neutral with respect to the transport mechanism used by to exchange requests and responses between the client and the instant invention. By way of example, supported transport methods include the following: HTTP using the CICS HTTP Listener; HTTP using the either the OS/390 HTTP Server or WebSphere/390; IBM MQSeries; Tibco Rendezvous, or SNA.

Figure 2:
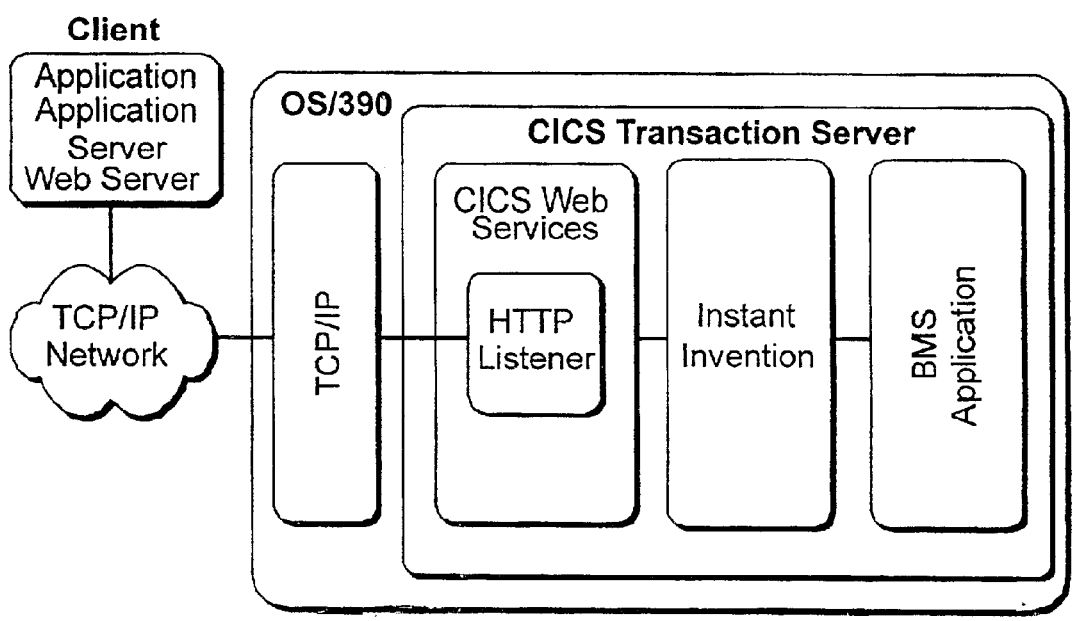
FIG. 2 illustrates a basic system architecture when utilizing the CICS HTTP Listener as the transport mechanism according to one embodiment of the instant invention.

FIG. 2 illustrates a basic system architecture when utilizing the CICS HTTP Listener as the transport mechanism. In FIG. 2, the following sequence of events results in the retrieval of XML data from CICS.

1. A client application sends an HTTP request with a URL identifying the destination as the CICS host and the present invention as the specific recipient.

2. The HTTP Listener receives the request and relays it to the present invention.

3. The present invention performs as described herein.

4. The present invention passes the resulting XML document to the HTTP Listener.

5. The HTTP Listener send the response to the client.

Figure 3:
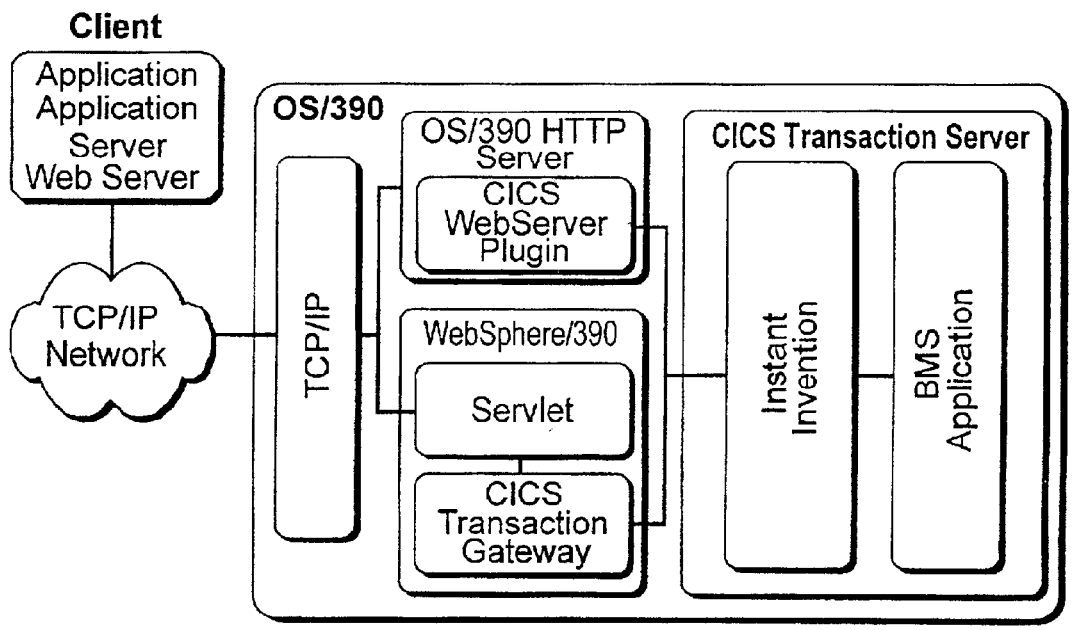
FIG. 3 illustrates a basic system architecture when utilizing either the OS/390 HTTP Server or WebSphere/390 as the transport mechanism according to one embodiment of the instant invention.

FIG. 3 illustrates a basic system architecture when utilizing either the OS/390 HTTP Server or WebSphere/390 as the transport mechanism. In FIG. 3, the following sequence of events results in the retrieval of XML data from CICS.

1. A client application sends an HTTP request with a URL identifying the destination as the CICS host and the present invention as the specific recipient.

2. The OS/390 HTTP Server or WebSphere/390 receive the request and relays it to the present invention.

3. The present invention performs as described herein.

4. The present invention passes the resulting XML document to OS/390 HTTP Server or WebSphere/390.

5. The OS/390 HTTP Server or WebSphere/390 send the response to the client.

Figure 4:
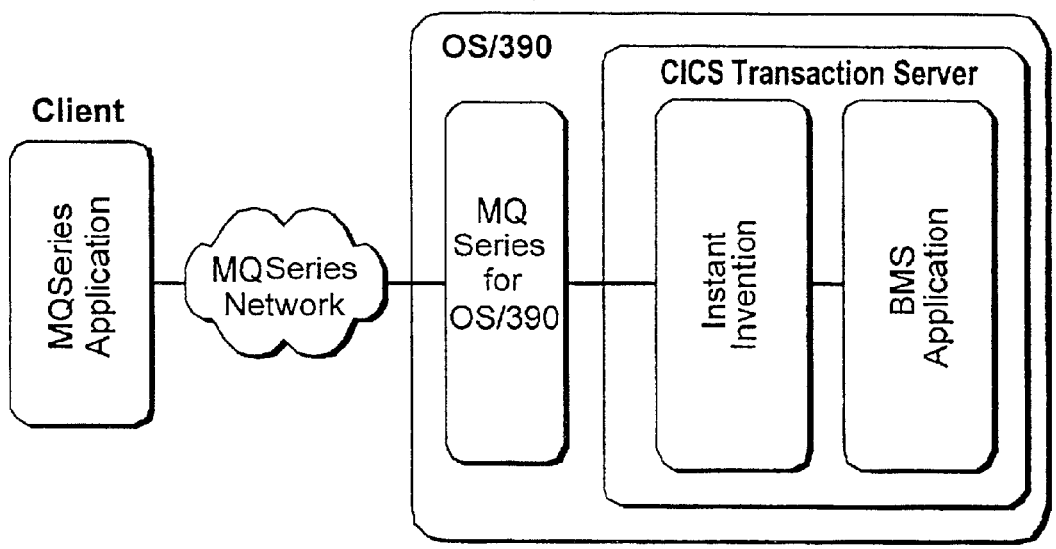
FIG. 4 illustrates a basic system architecture when utilizing IBM MQSeries as the transport mechanism according to one embodiment of the instant invention.

FIG. 4 illustrates a basic system architecture when utilizing IBM MQSeries as the transport mechanism. In FIG. 4, the following sequence of events results in the retrieval of XML data from CICS.

1. A client application places a message on an MQ queue indicating that the intended recipient for the message is the present invention running on the CICS host.

2. IBM MQSeries on the host receive the request and relays it to the present invention.

3. The present invention performs as described herein.

4. The present invention passes the resulting XML document to IBM MQSeries for delivery to the client.

5. IBM MQSeries sends the response to the client.

Figure 5:
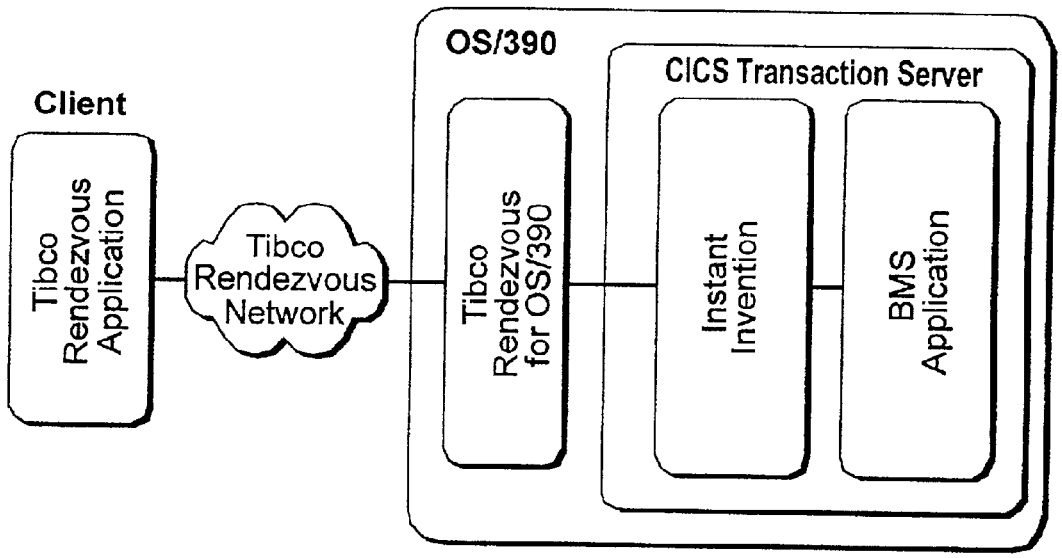
FIG. 5 illustrates a basic system architecture when utilizing Tibco Rendezvous as the transport mechanism according to one embodiment of the instant invention.

FIG. 5 illustrates a basic system architecture when utilizing Tibco Rendezvous as the transport mechanism. In FIG. 5, the following sequence of events results in the retrieval of XML data from CICS.

1. A client application sends a message across the Tibco Rendezvous network indicating that the recipient for the message is the present invention running on the CICS host 2. Tibco Rendezvous on the host receive the request and relays it to the present invention.

3. The present invention performs as described herein.

4. The present invention passes the resulting XML document to Tibco Rendezvous for delivery to the client.

5. Tibco Rendezvous delivers the response to the client.

Figure 6:
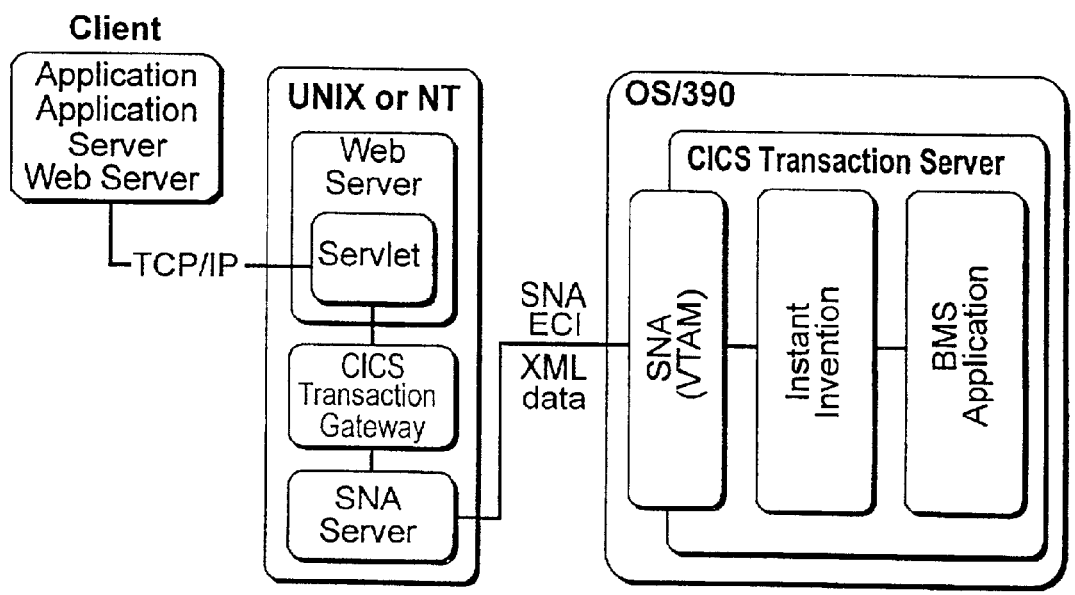
FIG. 6 illustrates a basic system architecture when utilizing SNA as the transport mechanism according to one embodiment of the instant invention.

FIG. 6 illustrates a basic system architecture when utilizing SNA as the transport mechanism into the host. This configuration requires a the presence of a middle-tier server running an HTTP server, CICS Transaction Gateway and an SNA protocol stack. The web server can be any HTTP server or application server, like WebSphere, that supports Java servlets. In FIG. 6, the following sequence of events results in the retrieval of XML data from CICS.

1. A client application sends an HTTP request with a URL identifying the destination as the web server and the servlet as the specific recipient.

2. The web server receives the request and passes it to the servlet.

3. The servlet invokes the services of CICS Transaction Gateway to forward the request to the present invention across the SNA network.

4. CICS Transaction Gateway used the External Call Interface (ECI) to call the present invention as a subroutine over an SNA connection.

5. The present invention is invoked and performs as described herein.

6. The present invention returns the resulting XML document across the same pathway through which the request was received.

7. The servlet ultimately delivers the response to the client.

Figure 7:
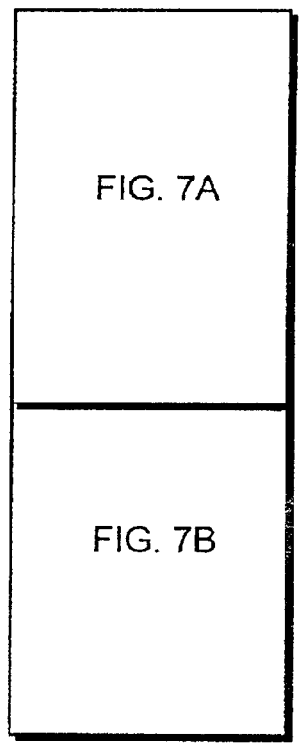
FIG. 7 illustrates the respective relationships of FIGS. 7A and 7B and FIGS. 8 and 8A.
Figure 7A:
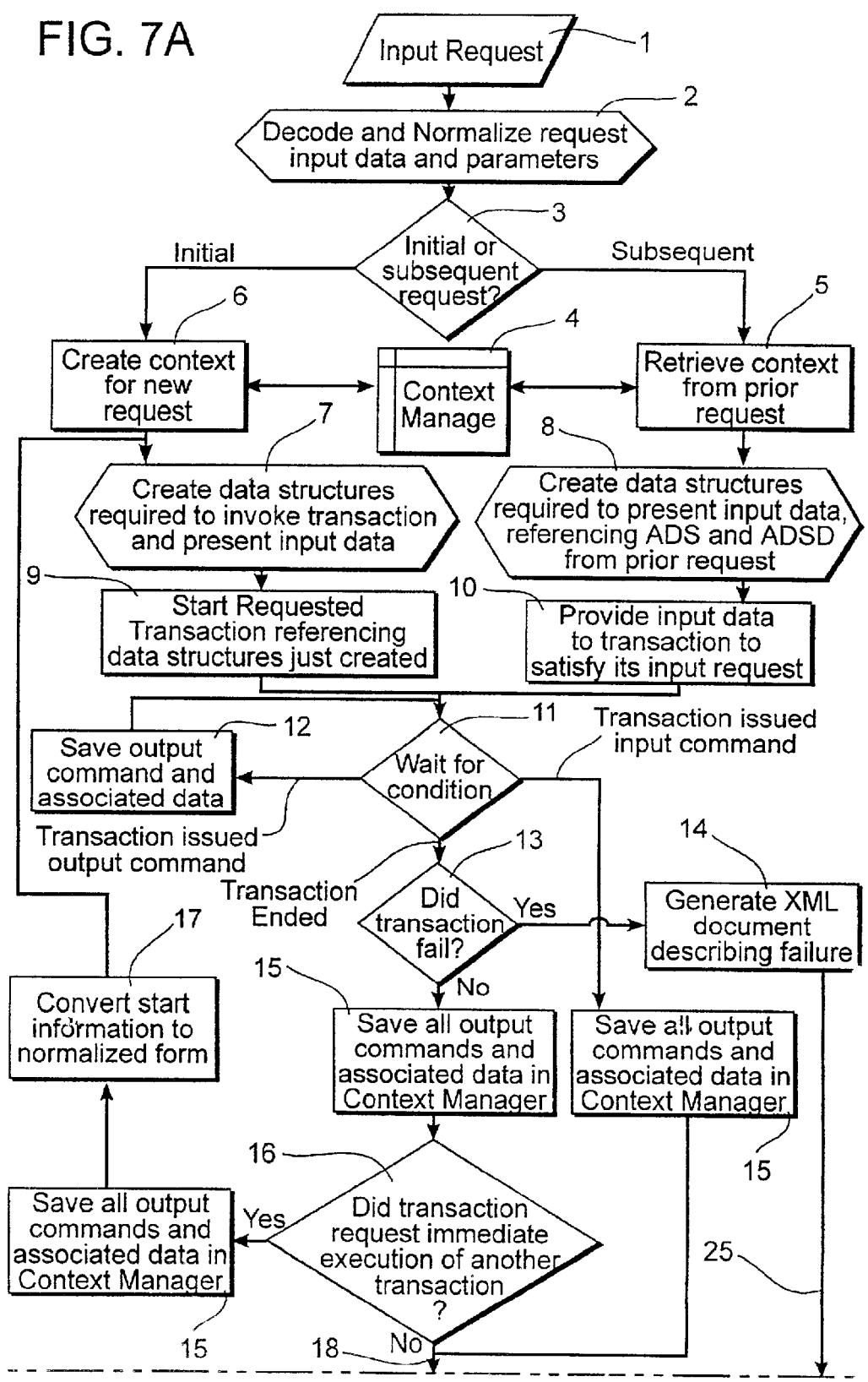
FIGS. 7A and 7B are flowcharts illustrating executional functionality associated with the invention's software initiation processing component.
Figure 7B:
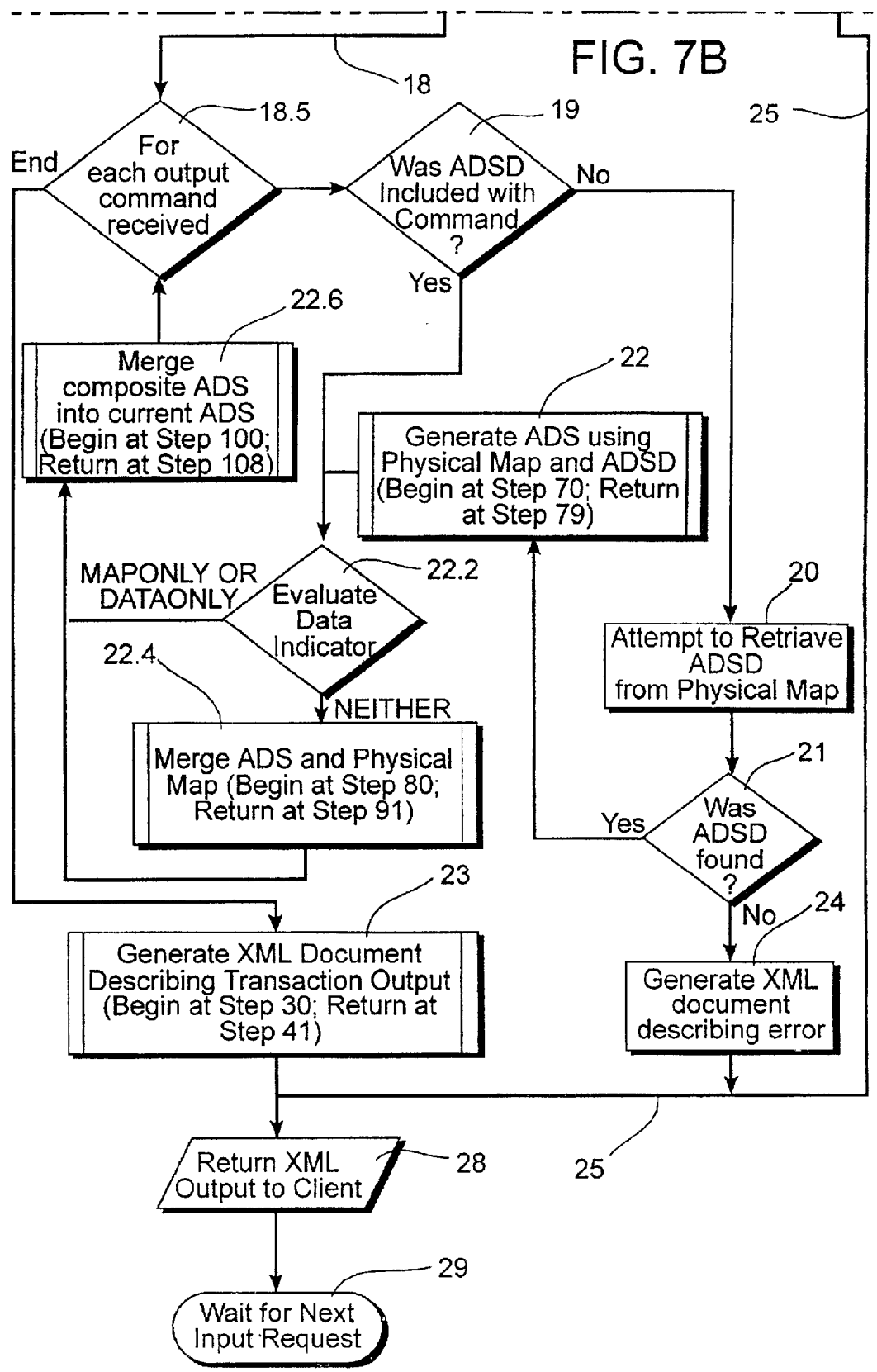

FIGS. 7A and 7B are flowcharts illustrating executional functionality associated with the invention's initiation processing component. Turning now to FIG. 7.

In FIG. 7, the process is started when an input request is received from a client. The specific form of the input request is unimportant. By way of example, the input request could be an expressed as an XML document, or as delimited URL data from an HTTP query string 1. Given that the specific form of the input request may vary, it is interpreted and converted into a standard form: the Request Information structure. The purpose of this structure is to put the request information into a form that is consistent across all requests and utilizes native computer data formats for efficiency 2. The Request Information structure is queried to see whether this is an initial request or a subsequent request. This is determined based upon the presence of a 'token' parameter received with the request. If there is not a token, then it considered to be an initial request. If there is a valid token, it is considered to be a subsequent request 3. The Context Manager is a data storage device that holds information that is keyed for later retrieval. The Context Manager allows information to be kept independently of the requests. Information stored concerns the context and state of requests. By way of example, the Context Manager is used to save information required to associate a request with CICS resources which may not have the same lifetime 4. A query is next performed using the request's token as the key, which retrieves the context from the prior request 5. For a new request, no context exists in the Context Manager. Generate a unique token for this request. Initialize the context data using the token to identify the new context 6. In order to invoke the requested transaction, the Terminal I/O Intercept Facility needs certain pieces of information. By way of example, the 3270 Bridge requires information such as the transaction identifier, user identification and password credentials, and the input data required to satisfy any initial input commands issued by the transaction. This information also includes parameters which tell 3270 Bridge how the input and output operations are to be intercepted 7. On subsequent requests, data received with the client request is used to satisfy input commands issued by the transaction. By way of example, the most common input command issued by a CICS BMS transaction is RECEIVE MAP. The RECEIVE MAP command expects input data to be presented to it in the form of an ADS. The instant invention must formulate the ADS such that it contains all input data received with the client request and/or required by the application. A 3270 terminal/controller has a data buffer which can be used to store field data between requests. In order to simulate this behavior, the instant invention uses the ADS's and ADSD's received with previous SEND MAP commands to formulate the ADS expected by a RECEIVE MAP command 8. The instant invention requests that the Terminal I/O Intercept Facility begin execution of the requested transaction, and provides it with any required input data or parameters. By way of example, 3270 Bridge requires that the instant invention issue a CICS START command 9. The instant invention requests that the Terminal I/O Intercept Facility continue execution of the requested transaction. The ADS formulated in step #8 is provided to the Terminal I/O Intercept Facility to satisfy the transaction's input command. By way of example, 3270 Bridge requires that the instant invention issue a CICS START command to continue execution of a pseudo-conversational transaction. For a conversational transaction, a CICS START command is not issued 10. The instant invention waits for one of three conditions: (1) the transaction issues an output command; (2) the transaction ends normally or abnormally; (3) the transaction issues an input command which needs to be satisfied 11. When the transaction issues an output command, the instant invention saves the output command and related information (e.g., ADS and ADSD) and returns to step #11 12. Transactions can terminate normally or abnormally. The instant invention uses status information provided by the Terminal I/O Intercept Facility to determine if the transaction ended normally or abnormally 13. The abnormal end information is used to generate an XML document which describes the error condition 14. Save all output commands and associated data in Context Manager. This information is used in step #8 for purposes of simulating the behavior of a 3270 terminal 15. CICS transactions can request that another transaction be started immediately. This causes the current transaction to end. By way of example, a CICS transaction can start another transaction by issuing the command RETURN IMMEDIATE or START (using the same terminal identifier). CICS will terminate the current transaction and start the specified transaction 16. The information provided about the transaction to be started is converted into the Request Information structure. This is the format also produced by Step #2 and expected by Step #7. A standard format for describing transaction requests allows them to be queued and processed more easily (there is no advanced information about how many transactions may ultimately be started) 17. In step #12, all the data from the output commands was collected and stored into a buffer. Now the instant invention will loop through the collected output commands and data, processing each in sequential order. In order to simulate the behavior of a 3270 terminal, the ADS may be created or modified during this process in steps #22, #22.4 and #22.6 18.5. This step queries the output command to see if it includes an ADSD. In most cases, the ADSD is provided with the output command. There are exceptions. By way of example, one case is when the SEND MAP command specified the MAPONLY option. The other case is when the map generation process did not specify that an ADSD was to be created and included in the physical map 19. If the ADSD was not included with the output command, then the instant invention will attempt to retrieve it from the physical map (the ADSD is an optional part of the physical map). By way of example, a BMS transaction specifies the name of the physical map using the MAPSET and MAP options of the SEND MAP command. The physical map is acquired through the use of the CICS LOAD command. Once acquired, the instant invention examines the physical map to determine if the ADSD is present 20. Check to see if Step #20 was successful in retrieving the ADSD from the physical map 21. If the ADSD is successfully retrieved in step #20 it is added to the output command so that it now contains a valid ADSD. The output command now has an ADSD but no ADS. This step calls a procedure that creates an ADS using the physical map and ADSD 22. This step assesses the output command to determine what information the transaction wants to be sent to the terminal (or simulated terminal): either the static data from the physical map, variable data from the ADS, or both. By way of example, a BMS transaction can specify a data indicator flag on a SEND MAP command. Valid values for this flag are MAPONLY and DATAONLY. If MAPONLY is specified, only static data from the physical map will be sent to the terminal. If DATAONLY is specified only variable data from the ADS will be sent to the terminal. If neither option is specified, both static and variable data will be sent to the terminal 22.2. The output command indicated that both the static data from the physical map and the variable data from the ADS are to be sent to the terminal. This step calls a procedure which merges information from the physical map into the ADS 22.4. In order to correctly simulate the behavior of a 3270 terminal, the instant invention must manage the contents of a composite ADS. This step calls a procedure which manages the composite ADS and merges it into the current ADS 22.6. Generate the XML document describing the transaction output. The detailed process is diagramed starting at Step #30 23. The ADSD was not found in the physical map. An XML document is generated which describes the error condition and possible solutions 24. The XML document is sent in response to the client request received in step #1 28. The instant invention waits for the next request to arrive. Once a request arrives, it begins processing at step #1 29.

Figure 8:
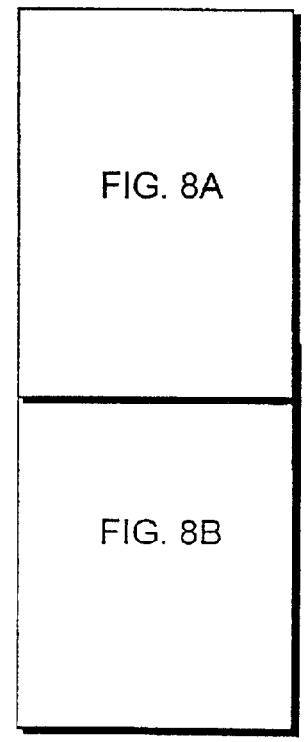
FIGS. 8, 8A and 8B are flowcharts illustrating the functionality of the invention's sub-process for generating an XML document according to an embodiment of the instant invention.
Figure 8A:
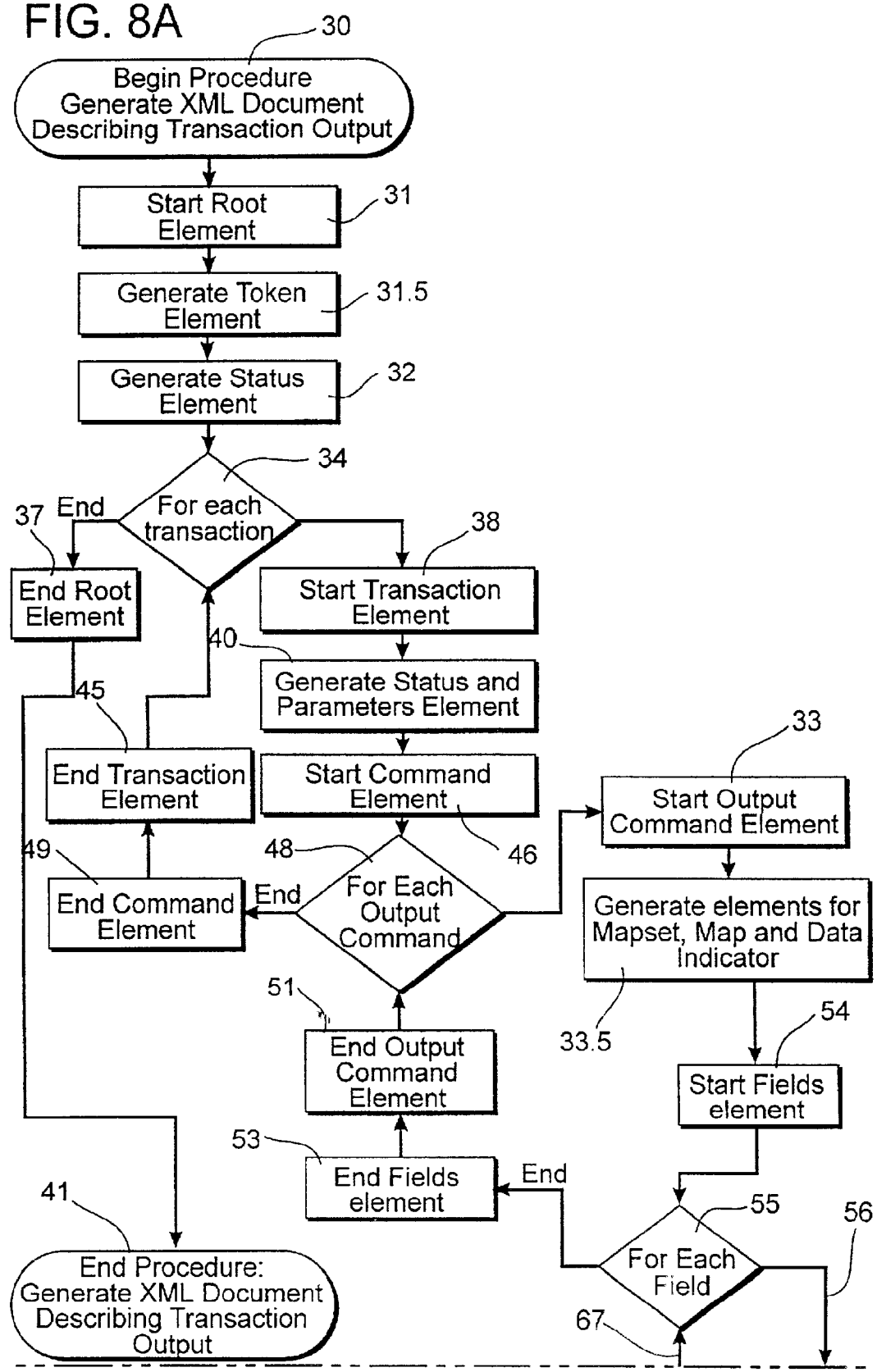

FIGS. 8 and 8A are flowcharts illustrating the functionality of the invention's sub-process for generating an XML document. Turning now to FIG. 8. XML requires all documents to have a root element. By way of example, the default root element used by the instant invention is <hostbridge> 31. The status element at this level of the XML document contains information from the instant invention pertaining to its handling of the request. For example, if the instant invention encounters a problem processing the request, that information is conveyed in this element 32. Each output command issued by the transaction is described by an element. The instant invention uses the name of the BMS command issued by the transaction as the name of the element. For example, if a SEND MAP command is issued by the transaction, the element will named SEND_MAP and started with the tag: <send map> 33. The names of the map and mapset, along with the data indicator, specified for this output command are included in the XML document. By way of example, the instant invention generates the following elements to express these values: <mapset>, <map> and <data_indicator> 33.5. As a result of processing the client request, multiple transactions may have been executed. The results of each transaction must be expressed in the XML document. Each transaction is processed until information regarding all transactions has been included in the XML document 34. The generation of the XML document is now complete. End the root element 37. Each transaction element contains information about a single transaction that was executed. In this section of the XML document, the instant invention includes information such as: transaction identifier; terminal identifier for the simulated terminal; next transaction requested; next transaction requested to run immediately; and the instant invention starts the transaction element with the tag:

<transaction> 38. The status element at this level of the XML document conveys information about the success or failure of the requested transaction. Any error is described using a decimal numeric code as well as a human readable description. The parameters element describes the input parameters received with the client request. The parameters element contains dependent elements which describe the individual parameter names and values specified 40. Return to point from which this procedure was invoked 41. The instant invention ends the transaction element with the tag: </transaction> 45. The command element of the XML document contains one dependent element for each output command issued by the transaction. This step begins the command element using the tag: <command> 46. For each output command issued by the transaction, the instant invention will perform the steps beginning at Step #33 48. The cursor position has three possible modes: none—no cursor position was specified; positional—a zero based numeric value was specified which represents the offset into the screen buffer of a 3270 terminal'; and symbolic Cursor Positioning—one of the fields was flagged as containing the cursor. The cursor type and its associated data are expressed as XML 48.2. The instant invention ends the command element using the tag: </command> 49. Each output command issued by the transaction is described by an element. This step ends the element started in step #33. The instant invention uses the name of the BMS command issued by the transaction as the name of the element. For example, if a SEND MAP command is issued by the transaction, the element will be named send_map and ended with the tag: </send_map> 51. The fields element started in step #54 is closed with the end tag: </fields> 53. Start the XML Fields element. By way of example, this element is started by including the <fields> tag in the XML document. The fields element will contain zero or more field elements (one field element for each field in current map) 54. For each field in the current ADS, a field element will be included in the XML document 55. Different clients may have preferences for how field elements are named. By way of example, the instant invention supports two naming conventions. Field elements can be generated either as <field> or as the actual field name used in the BMS MAP (e.g., <lastname>). The instant invention relies upon a flag, referred to as "Use BMS Field", to determine which convention to use. This flag is controlled by means of an optional parameter provided with the request 57. The "Use BMS Field" flag was not specified. As a result, the instant invention uses a generic identifier for the field element, such as <field> 58. The "Use BMS Field" flag was specified. As a result, the instant invention now generates the field element using the name of the BMS field as the element name. By way of example, for a field named "lastname", the field element would be generated as: <lastname> 59. Since the BMS field name was not used as the name of the field element, a name element is generated. The value of the name element will be the BMS field name. By way of example, for a field named "lastname" the name element would be generated as: <name>lastname</name> 60. The value element is used to contain the current value of a field. By way of example, for a field whose current value is "smith", the value element would be generated as: <value>smith</value>. The attr element is used to specify the current attributes of a field. Field attributes are expressed as attributes of the <attr> element (e.g., <attr byte="60" justify="l" disp="y" prot="y" num="n" int="n" mdt="n"/>) 61.

The extattr element is used to specify the current extended attributes of a field. Extended attributes are expressed as attributes of the <extattr> element (e.g., <extattr color="blue" hlt="def"/>) 62. Symbolic cursor positioning may be used by a transaction to denote in which field the cursor is to be located. This step queries the current field in the ADS to see if the symbolic cursor positioning flag is on. This flag indicates that the cursor should be placed in this field when displayed on a 3270 terminal 64. Generate the cursor_flag element within the current field element. The cursor_flag element is expressed as a null element (no value); for example, <cursor_flag/> 65. The tag generated to end the field element depends on how it was started. If the "Use BMS Field" flag was not specified, then the field element will be ended with the tag: </field>. If the "Use BMS Field" flag was specified, the field element will be ended with a tag based upon the name of the current field. By way of example, for a field named "lastname", the field element would be ended with the tag </lastname> 66.

Figure 9:
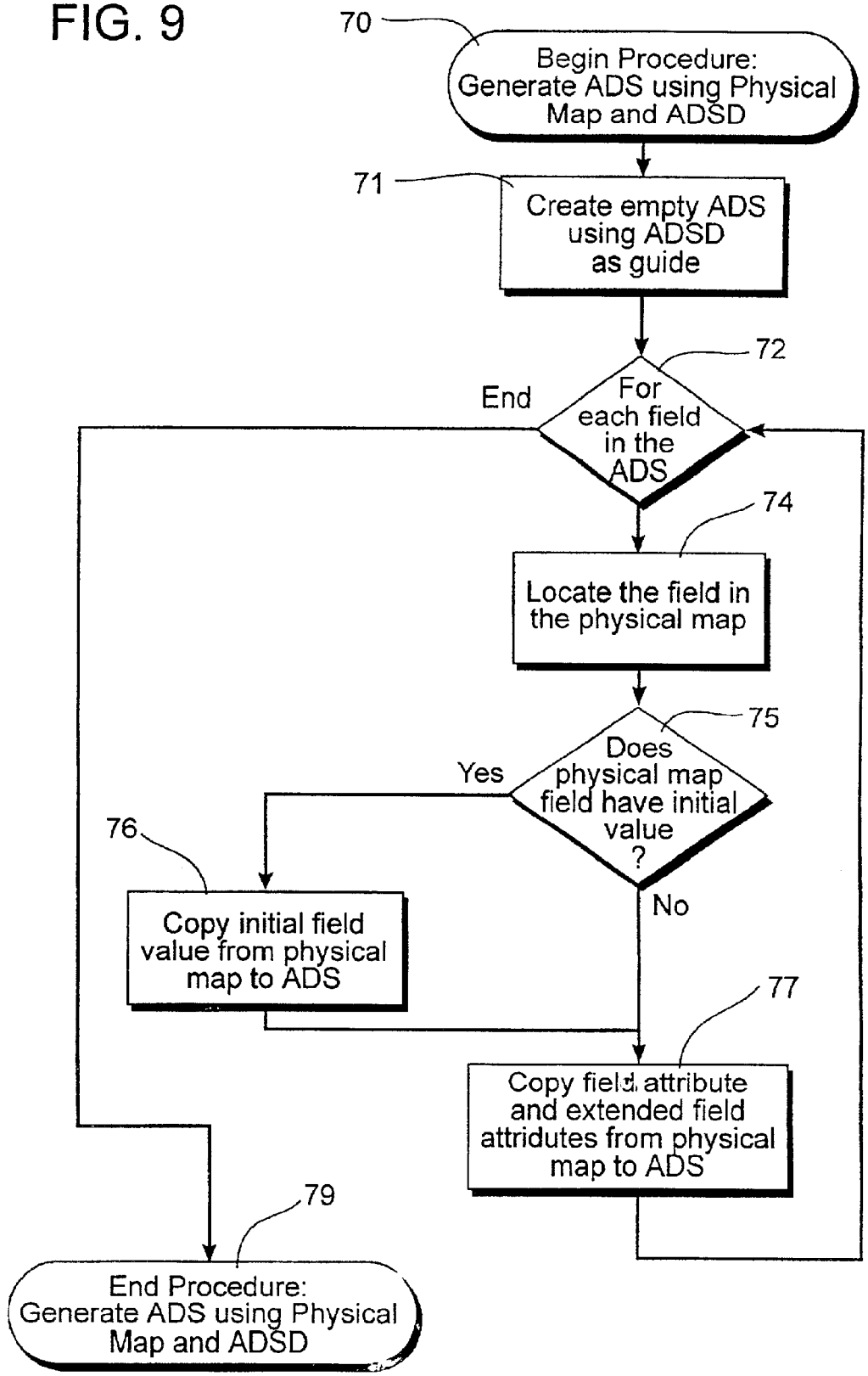
FIG. 9 is a flowchart illustrating the functionality of the invention's sub-process for generating an ADS using a Physical Map and ADSD according to an embodiment of the instant invention.

FIG. 9 is a flowchart illustrating the process of generating an ADS using a Physical Map and ADSD 70. Using the field information contained in the ADSD, create a corresponding ADS. Set all field values to blank 71. Start loop that processes each field in the newly created blank ADS 72. For the ADS field being processed, locate the corresponding field in the physical map. Note that the format of the ADS and physical map are not the same. For example, the physical map may contain more fields than the ADS 74. The definition of a field in a BMS map can include the specification of an initial/default value (using the INITIAL parameter). For the ADS field being processed, the physical map is queried to see if an INITIAL value was specified for the field 75. For the ADS field being processed, the field's value in the ADS is replaced with the INITIAL field value in the physical map 76. For the ADS field being processed, the field's attribute and extended attributes in the ADS are replaced by the corresponding values in the physical map 77. Return to point from which this procedure was invoked 79.

Figure 10:
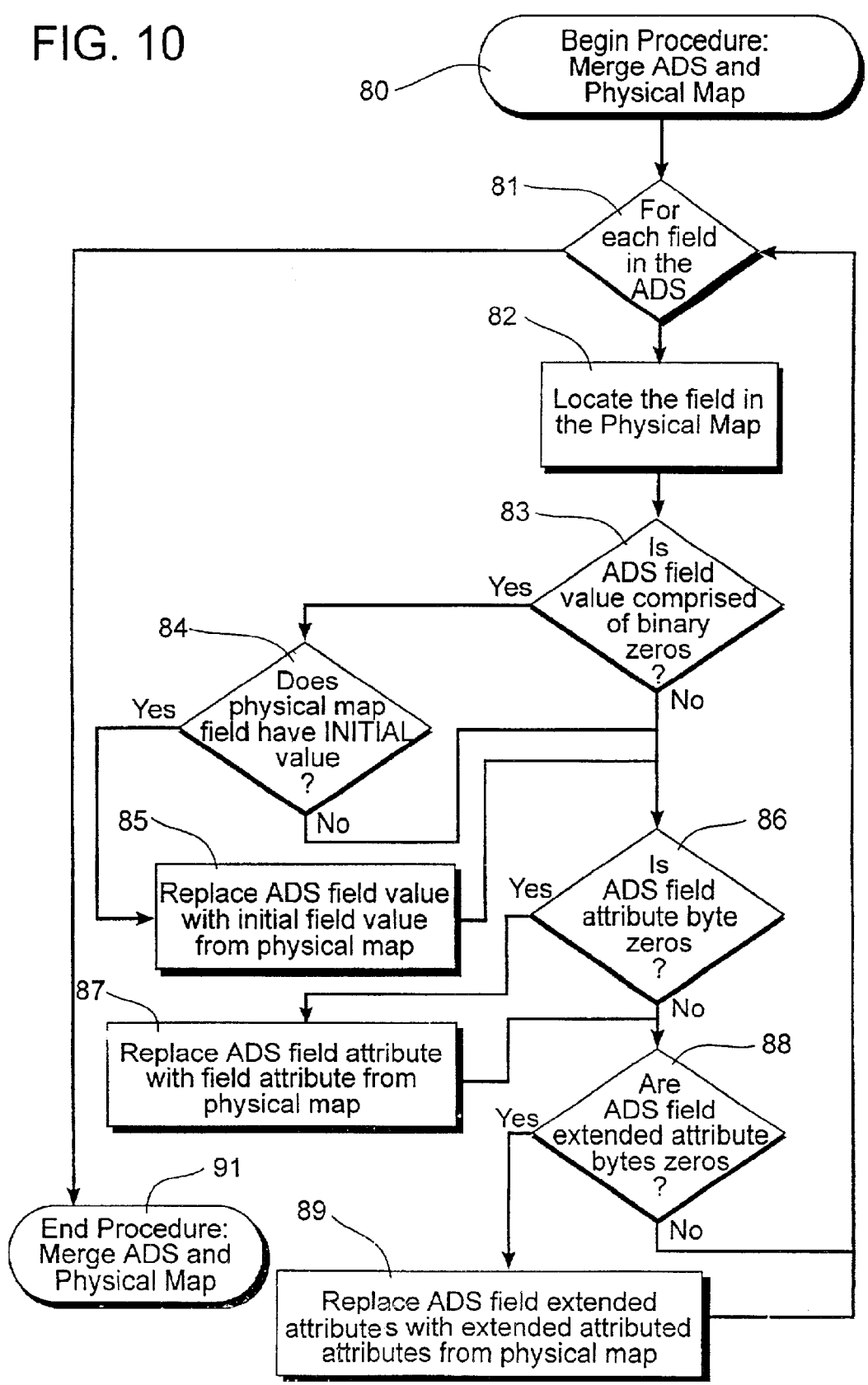
FIG. 10 is a flowchart illustrating the functionality of the invention's sub-process for merging an ADS and the Physical Map according to an embodiment of the instant invention.

FIG. 10 is a flowchart illustrating the process of merging the ADS and Physical Map 80. Start a loop that processes each field in the ADS 81. For the ADS field being processed, locate the corresponding field in the physical map. Note that the format of the ADS and physical map are not the same. For example, the physical map may contain more fields than the ADS 82. For the ADS field being processed, compare it's value to binary zeros and branch accordingly 83. For the ADS field being processed, query the corresponding field in the physical map to see if an INITIAL value was defined 84. For the ADS field being processed, replace the field's value in the ADS with the INITIAL field value in the physical map 85. For the ADS field being processed, compare it's field attribute to binary zero and branch accordingly 86. For the ADS field being processed, replace the field's attribute in the ADS with the attribute in the physical map 87. For the ADS field being processed, compare it's extended attributes to binary zeros and branch accordingly 88. For the ADS field being processed, replace the extended attributes in the ADS with the extended attributes in the physical map 89. Return to point from which this procedure was invoked 91.

Figure 11:
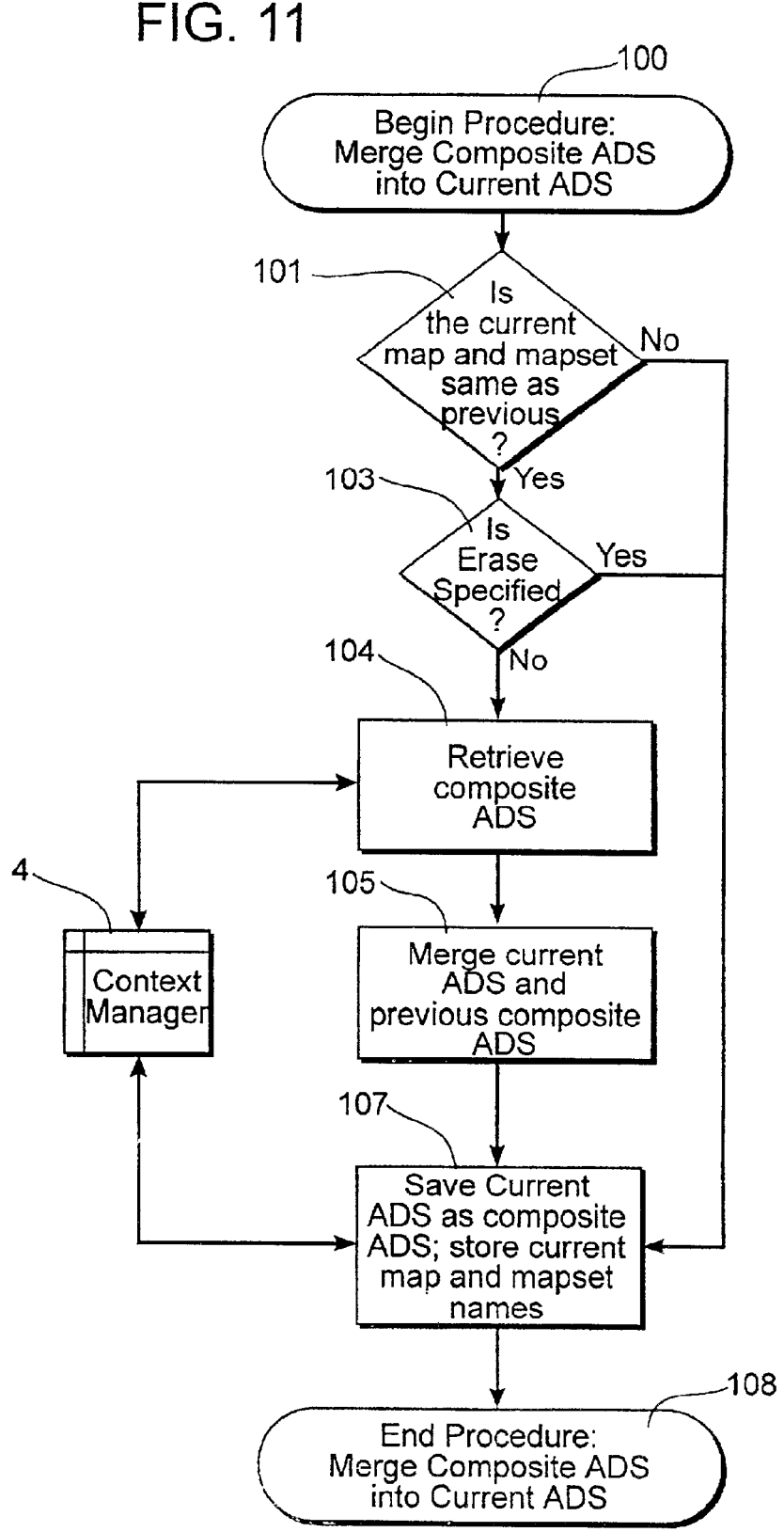
FIG. 11 is a flowchart illustrating the functionality of the invention's sub-process for managing and merging a composite ADS into the current ADS according to an embodiment of the instant invention.

FIG. 11 is a flowchart illustrating the process of managing the composite ADS and merging it into the current ADS 100. A 3270 terminal/controller maintains a buffer which contains the current contents of the screen (all fields). The buffer is cleared whenever a transaction issues an output command with the ERASE option. If a transaction issues multiple output commands (with no intervening ERASE), the buffer will contain the final/composite result from the sequence of output commands. If a particular field is not modified by an output command, then the field's contents remain unchanged. The instant invention simulates this behavior in this procedure by merging the composite ADS into the current ADS (the ADS associated with the output command currently being processed) 100. Check to see if the MAPSET and MAP of the current output request match the MAPSET and MAP of the previous request. If so, instant invention will begin a process to correctly simulate the behavior of a 3270 terminal 101. The output command is queried to determine if the ERASE option was specified. If so, this indicates that the terminal screen should be cleared. If so, then merging of the previous/composite ADS and current ADS is not needed; the current ADS is used without modification 103. Retrieve the composite ADS from the context manager. 104 The instant invention now merges the composite ADS into the current ADS (the ADS associated with the output command currently being processed). A field value in the composite ADS will be moved into the current ADS if the current ADS does not specify a value for the corresponding field. If the current ADS does contain data for a particular field, then that field's value remains unchanged. Field attributes and extended attributes are also merged in the same manner 105. Store the current ADS in the context manager as the composite ADS. As a result, the current ADS will be used as the composite ADS when processing the next output command. The MAPSET and MAP name associated with the current ADS are also stored. The names are used in step #35 107. End of procedure that manages the composite ADS and merges it into the current ADS 108.

Illustrated Of Use

By way of example and instruction, we now illustrate and compare the invocation and use of a sample CICS BMS transaction using both a 3270 terminal and the instant invention.

The CICS BMS transaction used in this illustration is one that simulates a stock trading application. The Share Trading Demonstration transaction, or TRAD, guides the end user through a sequence of screens that allows them to first select a company, and then select the action to be performed (i.e., obtain a quote, buy shares, or sell shares). Once these items are specified, it will then display the requested information on the terminal screen. The CICS transaction uses the BMS commands SEND MAP and RECEIVE MAP to communicate with the terminal.

First, we will illustrates how to use a 3270 terminal to obtain a stock quote for the Casey Import Export Company using the sample transaction.

Figure 12:
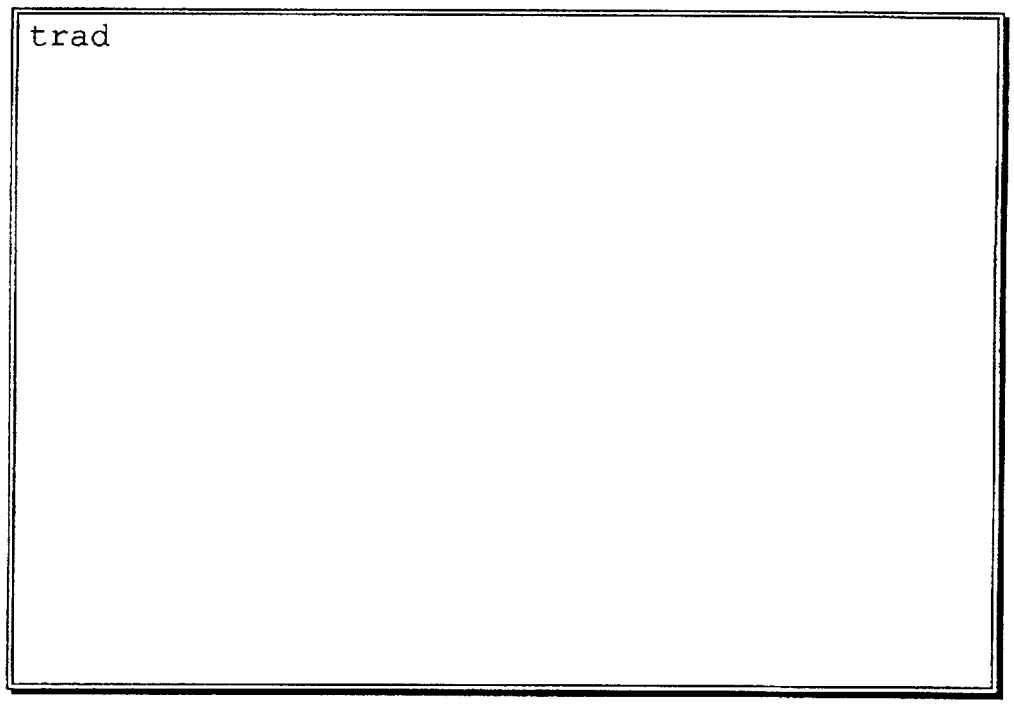

The first step in executing any CICS transaction from a terminal is entering the transaction name on the screen. The screen image illustrated in FIG. 12 (Terminal Input 1) depicts having entered the transaction name TRAD on the screen. Once entered, the end user presses the ENTER key on the keyboard.

Figure 13:
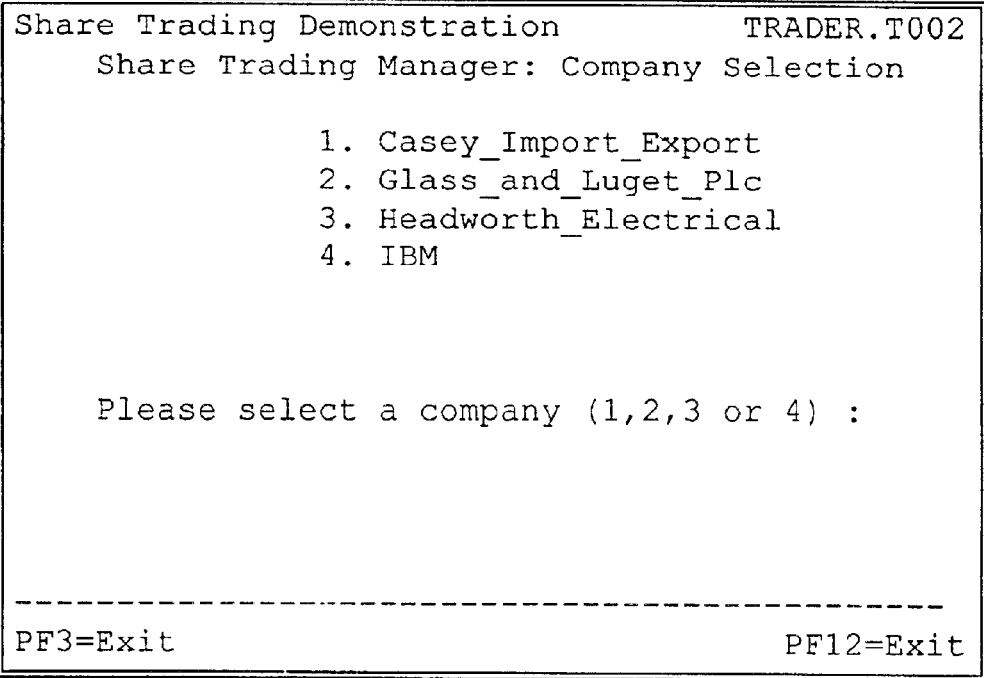

In response to this input, CICS starts the transaction called TRAD. The first operation performed by this transaction is to display the BMS map illustrated in FIG. 13 (Terminal Output 1). This screen allows the end user to select the company whose stock is to be acted upon.

The transaction now expects the end user to enter a number, 1 thru 4, indicating which company is to be acted upon. The screen image illustrated in FIG. 14 (Input 2) depicts having entered "1" to select the Casey Import Export company. Once entered, the end user presses the ENTER key.

In response, the transaction displays the BMS map illustrated in FIG. 15 (Terminal Output 2). This screen allows the end user to select the action to be performed for the selected company.

The transaction now expects the end user to enter a number, 1 thru 3, indicating which action is to be performed. The screen image illustrated in FIG. 16 (Terminal Input 3) depicts having entered "1" to request a stock quote. Once entered, the end user presses the ENTER key.

In response, the transaction displays the BMS map and data illustrated in FIG. 17 (Terminal Output 4). This screen displays the stock quote for the selected company.

If this is the last action to be performed by the transaction, it expects the end user to press the PF12 key on the keyboard. This will cause the transaction to terminate. In response to the PF12 key, the transaction displays a message on the terminal screen indicating that it has terminated. This message is illustrated in FIG. 18 (Terminal Output 5).

The above steps illustrated how an end-user would use a 3270 terminal to invoke and interact with the sample transaction.

We will now illustrate how a client program would invoke and interact with the sample transaction using the instant invention. The sample CICS BMS transaction invoked by the client application via the instant invention is the same as that invoked from the 3270 terminal (no programming changes were made to the sample transaction in order to be used by the instant invention).

By way of explanation, the instant invention allows client requests to be articulated as either a structured XML document or as an unstructured command string. In the examples below, client requests are expressed as a "query string" that could be included with an HTTP request. (An HTTP query string begins with a "?", and individual parameters are separated by an "&"). By way of illustration, parameters that begin with the characters "req_" will be interpreted by the instant invention as information required to control the processing of the request. Parameters that do not begin with these characters will be interpreted as transaction variables.

Requests may be sent to the instant invention using various methods. It is important to note that the functionality of the instant invention does not depend, nor change, based upon either the method selected to express or exchange requests and responses with the client.

The first request that must be sent from the client to the instant invention is one that specifies the name of the transaction to be invoked. To invoke the TRAD transaction, the following request might be used:

?req_tranid=trad&req_aid=enter

This request instructs the instant invention to start a transaction named "trad". In response, the instant invention would respond with the XML document illustrated in FIGS. 19A through 19C. This document corresponds to FIG. 13 (Terminal Output 1).

Figure 19:
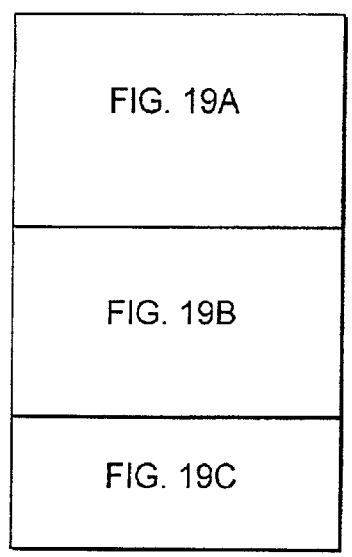
FIG. 19 illustrates the respective relationships of FIGS. 19A through 19C.

Note that the XML document illustrated in FIGS. 19A through 19C includes a <token> element indicating that the transaction specified a "next transaction id". The client must return this token to the instant invention on subsequent requests so that the instant invention can determine whether this is an "initial" or "subsequent" request (as described in the flowchart).

As before, the transaction now expects the client to select the company to be acted upon. To do so, the client would send the following request to the instant invention:

?req_tranid=trad&req_token=ca445fb5&req_aid=enter&option=1

Figure 20:
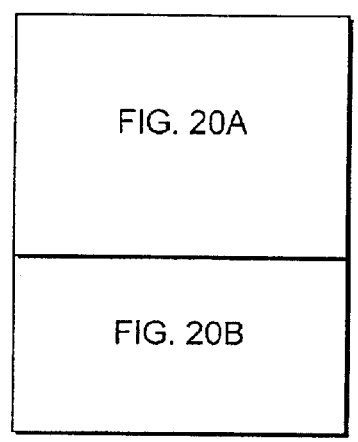
FIG. 20 illustrates the respective relationships of FIGS. 20A and 20B.
Figure 21:
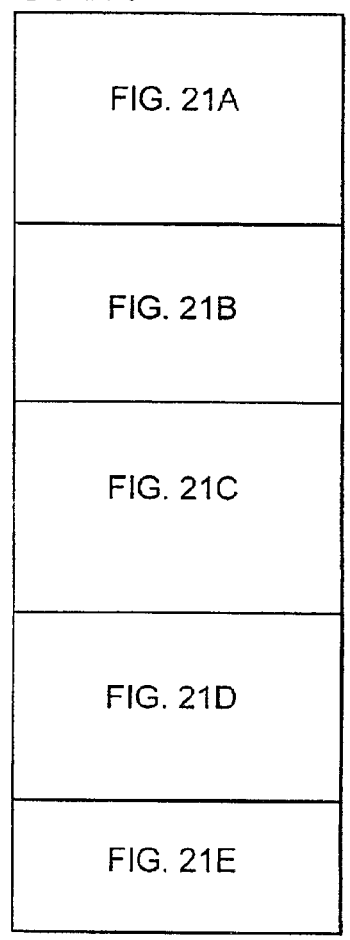
FIG. 21 illustrates the respective relationships of FIGS. 21A through 21E.

This request instructs the instant invention to continue the previous transaction and pass to it the value of "1" for the variable named "option". In response, the instant invention would respond with the XML document illustrated in FIGS. 20A and 20B. This document corresponds to FIG. 15 (Terminal Output 2).

The transaction now expects the client to select a number, 1 thru 3, indicating which action is to be performed. As before, a stock quote will be requested. To do so, the client would send the following request to the instant invention:

?req_tranid=trad&req_token=ca445fb5&req_aid=enter&opt2=1

This request instructs the instant invention to continue the previous transaction and pass to it the value of "1" for the variable named "opt2". In response, the instant invention would respond with the XML document illustrated in FIGS. 21A through 21E. This document corresponds to FIG. 17 (Terminal Output 3).

Upon receipt of XML Response 3, the client has obtained the desired information. As before, the transaction will now be terminated. To do so, the client would send the following request to the instant invention:

?req_tranid=trad&req_token=ca445fb5&req_aid=pf12

This request instructs the instant invention to continue the previous transaction, passing to it the indication that it should terminate. In response, the instant invention would respond with the XML document illustrated in FIG. 22, indicating that the transaction has terminated. Note that this final XML document does not include a <token> element. This indicates that the transaction has ended without specifying a "next transaction id".

The claims and the specification describe the invention presented and the terms that are employed in the claims draw their meaning from the use of such terms in the specification. The same terms employed in the prior art may be broader in meaning than specifically employed herein. Whenever there is a question between the broader definition of such terms used in the prior art and the more specific use of the terms herein, the more specific meaning is meant.

While the invention has been described with a certain degree of particularity, it will be recognized by those skilled in the art that many changes may be made. In the sequence of process step execution, details of construction and the arrangement of components without departing from the spirit and scope of this disclosure. It is understood that the invention is not limited to the embodiments set forth herein for purposes of exemplification, but is to be limited only by the scope of the attached claim or claims, including the full range of equivalency to which each element thereof is entitled.

Figure 8B:
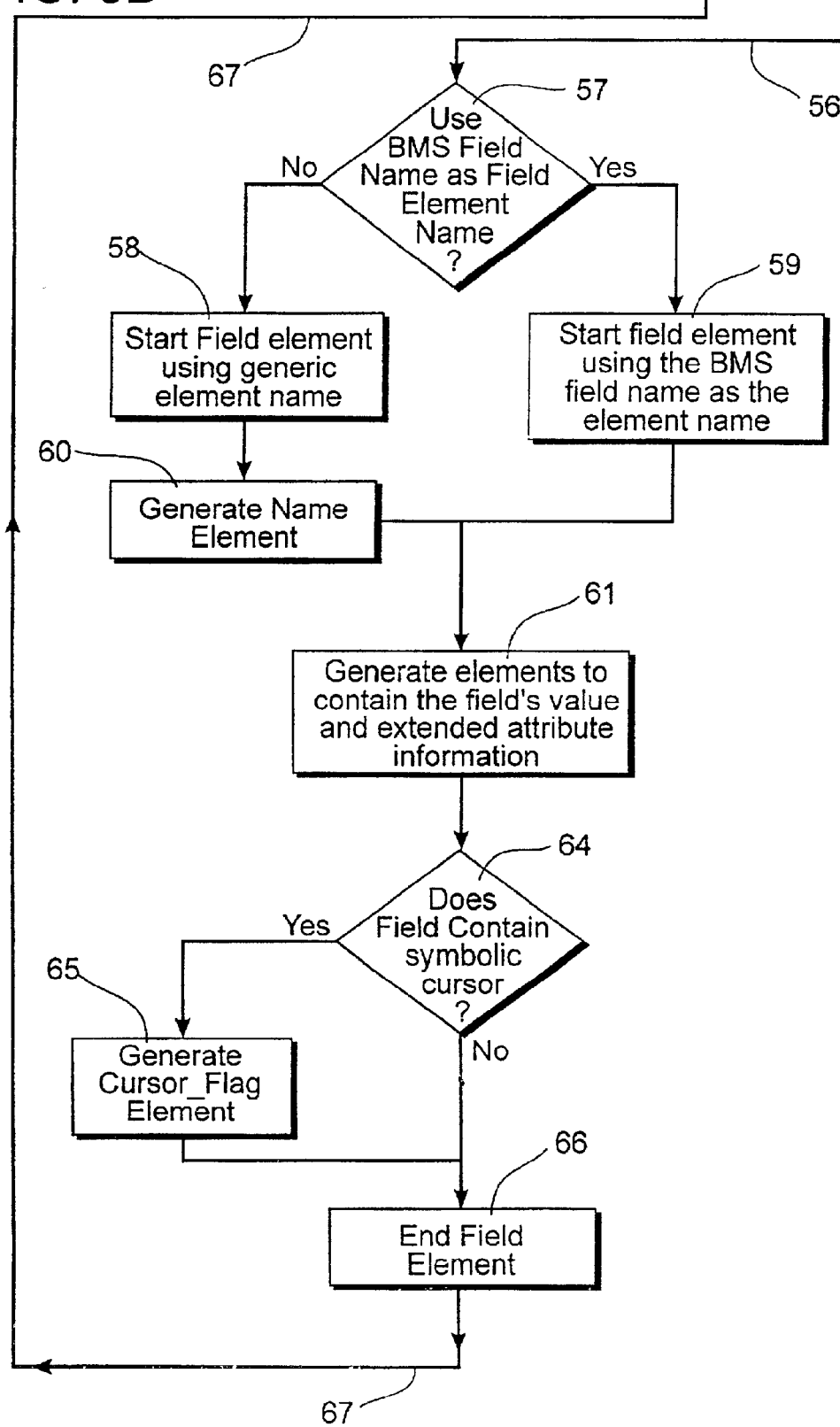

The following code specification was provided in U.S. Provisional Application No. 60/262,903, filed Jan. 19, 2001, and is incorporated in its entirety herein. As such, the code specification provides for complete though non-limiting disclosure of the process used by the present invention to generate an XML document. This specification is further illustrated by the flowchart in FIGS. 8A and 8B.

A sample XML document structure created by this process is also illustrated.

The following conventions are used within this document:

"BEGIN TAG:" means that a beginning tag, of the indicated name, will be included in the XML document.

"END TAG:" means that an ending tag, of the indicated name, will be included in the XML document.

"INCLUDE:" means that the specified information or value will be included in the XML document.

"PERFORM:" means that the specified process is performed at this point.

```
Begin Process: Generate_XML_Output
    INCLUDE: Standard XML header
    INCLUDE: XML comment with HostBridge copyright information
    BEGIN TAG: HostBridge
        BEGIN TAG: token
        INCLUDE: HostBridge token value
        END TAG: token
        *** NOTE: Refer to XML Output: Point A
        BEGIN TAG: status
            BEGIN TAG: response
            INCLUDE: response value
            END TAG: response
            BEGIN TAG: description
            INCLUDE: response description
            END TAG: description
            BEGIN TAG: cics_response
            INCLUDE: cics_response value
            END TAG: cics_response
            BEGIN TAG: cics_description
            INCLUDE: cics_description value
            END TAG: cics_description
            BEGIN TAG: cics_response2
            INCLUDE: cics_response2 value
            END TAG: cics_response2
        END TAG: status
        *** NOTE: Refer to XML Output: Point B
        BEGIN TAG: transaction
            BEGIN TAG: facility_name
            INCLUDE: facility_name value
            END TAG: facility_name
            BEGIN TAG: facility_keep_time
            INCLUDE: facility_keep_time value
            END TAG: facility_keep_time
            *** NOTE: Refer to XMIL Output: Point C
            PERFORM: Include_Transaction_Parameters
            *** NOTE: Refer to XML Output: Point D
            PERFORM: Include_Transaction_Data
            *** NOTE: Refer to XMIL Output: Point E
        END TAG: transaction
    END TAG: HostBridge
    *** NOTE: Refer to XML Output: Final
End Process: Generate_XML Output
Begin Process: Include_Transaction_Parameters
    BEGIN TAG: parameters
    BEGIN TAG: input
        BEGIN TAG: tranid
        INCLUDE: tranid value
        END TAG: tranid
        BEGIN TAG: aid
        INCLUDE: aid value
        END TAG: aid
        BEGIN TAG: cursor_position
        INCLUDE: cursor_position value
        END TAG: cursor_position
    END TAG: input
    BEGIN TAG: output
        BEGIN TAG: task_end_status
        INCLUDE: task_end_status value
        END TAG: task_end_status
        BEGIN TAG: abend_code
        INCLUDE: abend_code value
        END TAG: abend_code
        BEGIN TAG: next_tranid
        INCLUDE: next_tranid value
        END TAG: next_tranid
        BEGIN TAG: next_start_code
        INCLUDE: next_start_code value
        END TAG: next_start_code
    END TAG: outout
END TAG: parameters
End Process: Include_Transaction_Parameters
Begin Process: Include_Transaction_Data
    BEGIN TAG: command
        For each command in the input data
        {
            *** NOTE: At this point, we generate the XML to describe
            the specific commands included in the input data. A num-
            ber of different commands are possible. The following
            process illustrates the steps taken to process the
```

-continued

```
            "Send Map" command. This command is the most
            complex. Processing of all other commands are ac-
            complished using a subset of the "Send Map" process.
            PERFORM: Include_Send_Map Command
        }
    END TAG: command
End Process: Include Transaction Data
Begin Process: Include_Send_Map_Command
    BEGIN TAG: send_map
        PERFORM: Include_Control_Indicators
        BEGIN TAG: mapset
        INCLUDE: mapset value
        END TAG: mapset
        BEGIN TAG: map
        INCLUDE: map value
        END TAG: map
        BEGIN TAG: data_indicator
        INCLUDE: data_indicator value
        END TAG: data_indicator
        PERFORM: Include_Data_Fields
    END TAG: send_map
End Process: Include_Send_Map_Command
Begin Process: Include Control Indicators
    BEGIN TAG: control_indicators
        BEGIN TAG: erase
        INCLUDE: erase value
        END TAG: erase
        BEGIN TAG: erase_all_unprot
        INCLUDE: erase_all_unprot value
        END TAG: erase_all_unprot
        BEGIN TAG: unlock_kbd
        INCLUDE: unlock_kbd value
        END TAG: unlock_kbd
        BEGIN TAG: alarm
        INCLUDE: alarm value
        END TAG: alarm
        BEGIN TAG: reset_kbd
        INCLUDE: reset_kbd value
        END TAG: reset_kbd
        BEGIN TAG: last_output
        INCLUDE: last_output value
        END TAG: last_output
        BEGIN TAG: cursor
        INCLUDE: cursor value
        END TAG: cursor
    END TAG: control_indicators
End Process: Include_Control_Indicators
Begin Process: Include_Data_Fields
    BEGIN TAG: data_descriptor
        BEGIN TAG: field_count
        INCLUDE: field_count value
        END TAG: field_count
        BEGIN TAG: attribute_number
        INCLUDE: attribute_number value
        END TAG: attribute_number
        BEGIN TAG: attribute_type_codes
        INCLUDE: attribute_type_codes value
        END TAG: attribute_type_codes
        BEGIN TAG: write_control_char
        INCLUDE: write_control_char value
        END TAG: write_control_char
    END TAG: data_descriptor
    BEGIN TAG: data
        For each data field in the input data
        {
            BEGIN TAG: field
                BEGIN TAG: name
                INCLUDE: name value
                END TAG: name
                BEGIN TAG: value
                INCLUDE: value value
                END TAG: value
                BEGIN TAG: length
                INCLUDE: length value
                END TAG: length
            END TAG: field
        }
    END TAG: data
End Process: Include_Data_Fields
```

```
XML Output: Point A
<?xml version="1.0" ?>
<!-- HostBridge Generated Output -->
<!-- HostBridge Copyright (c) 2000, 2001 Russell W. Teubner -->
<HostBridge>
        <token>_____</token>
XML Output: Point B
<?xml version="1.0" ?>
<?-- HostBridge Generated Output -->
<?-- HostBridge Copyright (c) 2000, 2001 Russell W. Teubner -->
<HostBridge>
        <token>_____</token>
        <status>
            <response>_____</response>
            <description>_____</description>
            <cics_response>_____</cics_response>
            <cics_description>_____</cics_description>
            <cics_response2>_____</cics_response2>
        </status>
XML Output: Point C
<?xml version="1.0" ?>
<!-- HostBridge Generated Output -->
<!-- HostBridge Copyright (c) 2000, 2001 Russell W. Teubuer -->
<HostBridge>
        <token>_____</token>
        <status>
            <response>_____</response>
            <description>_____</description>
            <cics_response>_____</cics_response>
            <cics_description>_____</cics_description>
            <cics_response2>_____</cics_response2>
        </status>
        <transaction>
            <facility_name>_____</facility_name>
            <facility keep_time>_____</facility_keep_time>
XML Output: Point D
<?xml version="1.0" ?>
<!-- HostBridge Generated Output -->
<!-- HostBridge Copyright (c) 2000, 2001 Russell W. Teubner ->
<HostBridge>
        <token>_____</token>
        <status>
            <response>_____</response>
            <description>_____</description>
            <cics_response>_____</cics_response>
            <cics_description>_____</cics_description>
            <cics_response2>_____</cics_response2>
        </status>
        <transaction>
            <facility_name>_____</facility_name>
            <facility_keep_time>_____</facility_keep_time>
            <parameters>
                <input>
                    <tranid>_____</tranid>
                    <aid>_____</aid>
                    <cursor_position>_____</cursor_position>
                </input>
                <output>
                    <task_end_status>_____</task_end_status>
                    <abend_code>_____</abend_code>
                    <next_tranid>_____</next_tranid>
                    <next_start_code>_____</next_start_code>
                </output>
            </parameters>
XML Output: Point E
<?xml version="1.0" ?>
<!-- HostBridge Generated Output -->
<!-- HostBridge Copyright (c) 2000, 2001 Russell W. Teubner ->
<HostBridge>
        <token>_____</token>
        <status>
            <response>_____</response>
            <description>_____</description>
            <cics_response>_____</cics_response>
            <cics_description>_____</cics_description>
            <cics_response2>_____</cics_response2>
        </status>
        <transaction>
            <facility_name>_____</facility_name>
```

-continued

```
        <facility keep_time>_____</facility _keep_time>
        <parameters>
            <input>
                <tranid>_____</tranid>
                <aid>_____</aid>
                <cursor_position>_____</cursor_position>
            </input>
            <output>
                <task_end_status>_____</task_end_status>
                <abend_code>_____</abend_code>
                <next_tranid>_____</next_tranid>
                <next_start_code>_____</next_start_code>
            <output>
        </parameters>
        <command>
            <send_map>
                <control_indicators>
                    <erase>_____</erase>
                    <erase_all_unprot>_____</erase_all_unprot>
                    <unlock_kbd>_____</unlock_kbd>
                    <alarm>_____</alarm>
                    <reset_kbd>_____</reset_kbd>
                    <last_output>_____</last_output>
                    <cursor>_____</cursor>
                </control_indicators>
                <mapset>_____</mapset>
                <map>_____</map>
                <data_indicator>_____</data_indicator>
                <data_descriptor>
                    <field_count>_____</field_count>
                    <attribute_number>_____</attribute_number>
                    <attribute_type_codes>___</attribute_type_codes>
                    <write_control_char>___</write_control_char>
                </data_descriptor>
                <data>
                    <field>
                        <name>_____</name>
                        <value>_____<value>
                        <length>_____</length>
                    </field>
                    .
                    . *** NOTE: Occurs multiple times based upon
                    . the number of fields in the input data.
                    .
                    <field>
                        <name>_____</name>
                        <value>_____</value>
                        <length>_____</length>
                    </field>
                </data>
            </send_map>
        </command>
XML Output: FINAL
<?xml version="1.0" ?>
<!-- HostBridge Generated Output -->
<!-- HostBridge Copyright (c) 2000, 2001 Russell W. Teubner ->
<HostBridge>
    <token>_____<token>
    <status>
        <response>_____</response>
        <description>_____</description>
        <cics_response>_____</cics_response>
        <cics_description>_____</cics_description>
        <cics_response2>_____</cics_response2>
    </status>
    <transaction>
        <facility_name>_____</facility_name>
        <facility_keep_time>_____</facility_keep_time>
        <parameters>
            <input>
                <tranid>_____</tranid>
                <aid>_____</aid>
                <cursor_position>_____</cursor_position>
            </input>
            <output>
                <task_end_status>_____</task_end_status>
                <abend_code>_____</abend_code>
                <next_tranid>_____</next_tranid>
                <next_start_code>_____</next_start_code>
```

```
            </output>
        </parameters>
        <command>
            <send_map>
                <control_indicators>
                    <erase>_____</erase>
                    <erase_all_unprot>_____</erase_all_unprot>
                    <unlock_kbd>_____</unlock_kbd>
                    <alarm>_____</alarm>
                    <reset_kbd>_____</reset_kbd>
                    <last_output>_____</last_output>
                    <cursor>_____</cursor>
                </control_indicators>
                <mapset>_____</mapset>
                <map>_____</map>
                <data_indicator>_____</data indicator>
                <data_descriptor>
                    <field_count>_____</field_count>
                    <attribute_number>_____</attribute_number>
                    <attribute_type_codes>___</attribute_type_codes>
                    <write_control_char>___</write_control_char>
                </data_descriptor>
                <data>
                    <field>
                        <name>_____<name>
                        <value>_____</value>
                        <length>_____</length>
                    </field>
                    .
                    . *** NOTE: Occurs multiple times based upon
                    . the number of fields in the input data.
                    .
                    <field>
                        <name>_____</name>
                        <value>_____</value>
                        <length>_____</length>
                    </field>
                </data>
            </send_map>
        </command>
    </transaction>
</HostBridge>
```

What is claimed:

1. A system to facilitate the invocation of a CICS transaction within a server central processing unit via a client central processing unit communicated request, converting said invoked transaction's output to an XML document and the communicating of said XML document to said client central processing unit comprising:

at least one server central processing unit executing CICS under the dispatching control of said server's operating system;

at least one client central processing unit; and software executing within said server central processing unit which adapts said server to respond to a request communicated from said client central processing unit by invoking the execution of a CICS transaction within said server, converting said executed transaction's output to an XML document and communicating said XML document to said client central processing unit.

2. The system of claim 1 further comprising at least one intermediary central processing unit which first receives said transmitted request prior to communicating the request to said server central processing unit.

3. A computer based method for facilitating the invocation of a CICS transaction within a server central processing unit via a client central processing unit communicated request, converting said invoked transaction's output to an XML document and communicating said XML document to said client central processing unit comprising:

receiving an input request from a client;

converting said received request to a standard format;

identifying said request as an initial or subsequent request by determining the presence or non-presence of a token communicated with the request;

creating data structures required to invoke a CICS transaction if initial request, or present data if responding to a prior request;

initiating a CICS transaction if initial request, or providing data to previously initiated transaction if responding to a prior request;

awaiting and identifying response to said transaction initiation or said data provision from a group of possible responses including the transaction issued an output command, the transaction issued an input command, the transaction ended, or the transaction ended abnormally;

continuing process executing based upon results of said identification;

generating an XML document based upon said continuing process execution; and waiting for the next communicated input request.

4. The method of claim 3 wherein the response being identified as the transaction issued an output command further comprises saving the output command and related ADS and ADSD information.

5. The method of claim 3 wherein the response being identified as the transaction issued an input command further comprises:

storing all output commands and associated data in a buffer to allow for simulation of a 3270 type terminal;

processing all stored output commands;

generating an XML document based upon said output commands which have been normalized; and communicating said generated XML document to said client central processing unit.

6. The method of claim 5 wherein said processing further comprises generating an ADS.

7. The method of claim 5 wherein said processing further comprises merging physical map information into an ADS.

8. The method of claim 5 wherein said processing further comprises merging the composite ADS into current ADS.

9. The method of claim 3 wherein the response being identified as the transaction ended abnormally further comprises:

generating an XML document and communicating said XML document describing error to said client central processing unit.

10. The method of claim 9 wherein said processing further comprises merging the composite ADS into current ADS.

11. The method of claim 3 wherein the response being identified as the transaction ended further comprises:

having determined the transaction requested immediate execution of a subsequent transaction;

storing all commands and associated data in a buffer; and, creating data structures and initiating any identified transactions to be immediately invoked.

12. The method of claim 3 wherein the response being identified as the transaction ended further comprises:

having determined the transaction did not request immediate execution of a subsequent transaction;

storing all output commands and associated data in a buffer to allow for simulation of a 3270 type terminal;

processing all stored output commands;

generating an XML document based upon said output commands which have been normalized; and communicating said generated XML document to said client central processing unit.

13. The method of claim 12 wherein said processing further comprises generating an ADS.

14. The method of claim 12 wherein said processing further comprises merging physical map information into an ADS.

15. The method of claim 12 wherein said processing further comprises merging the composite ADS into current ADS.

16. The method of claim 3 wherein said received input request is received in the form of an XML document.

17. The method of claim 3 wherein said received input request is received in the form of delimited URL data including an HTTP Query string.

18. The method of claim 3 wherein said identifying, creating, initiating, awaiting and waiting, occurs in an iterative manner.

19. An apparatus for facilitating the invocation of a CICS transaction within a server central processing unit via a client communicated central processing unit request, converting said invoked transaction's output to an XML document and transmitting said XML document to said client central processing unit comprising:

a general purpose computer;

a memory that stores a program which XML-enables CICS transactions; and a central processing unit that, when executing said program, adapts said general purpose computer to facilitate the invocation of a CICS transaction within said central processing unit based upon a e client communicated central processing unit request, converts said invoked transaction's output to an XML document and transmits said XML document to a client central processing unit.

20. An apparatus for facilitating the invocation of a CICS transaction within a server central Processing unit via a client communicated central processing unit request, converting said invoked transaction's output to an XML document and transmitting said XML document to said client central processing unit comprising:

a general purpose computer;

a memory that stores a program which XML-enables CICS transactions; and a central processing unit that, when executing said program, adapts said general purpose computer to facilitate the invocation of a CICS transaction within said central processing unit based upon a client communicated central processing unit request, converts said invoked transaction's output to an XML document and transmits said XML document to a client central processing unit wherein said executing program's adaptation of said general purpose computer further comprises:

receiving an input request from a client;

converting said received request to a standardized format;

identifying said request as an initial or subsequent request by determining the presence or non-presence of a token communicated with the request;

creating data structures required to invoke a CICS transaction if initial request, or present data if responding to a prior request;

initiating a CICS transaction if initial request, or providing data to previously initiated transaction if responding to a prior request;

awaiting and identifying response to said transaction initiation or said data provision from a group of possible responses including the transaction issued an output command, the transaction issued an input command, the transaction ended, or the transaction ended abnormally;

continuing process execution based upon results of said identification;

generating an XML document based upon said continuing process execution; and waiting for the next communicated input request.

* * * * *